United States Patent
Na et al.

(10) Patent No.: US 10,028,089 B2
(45) Date of Patent: Jul. 17, 2018

(54) METHOD AND APPARATUS FOR ESTIMATING LOCATION IN A TERMINAL

(71) Applicant: Samsung Electronics Co., Ltd., Suwon-si, Gyeonggi-do (KR)

(72) Inventors: In-Hak Na, Yongin-si (KR); Sang-Jun Moon, Yongin-si (KR); Sin-Seok Seo, Seongnam-si (KR); Sang-Hyun Chang, Seoul (KR); Dae-Kyu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/346,141

(22) Filed: Nov. 8, 2016

(65) Prior Publication Data
US 2017/0195834 A1 Jul. 6, 2017

(30) Foreign Application Priority Data
Jan. 5, 2016 (KR) .......... 10-2016-0001140

(51) Int. Cl.
*H04W 24/00* (2009.01)
*H04W 4/02* (2018.01)
*G01S 5/02* (2010.01)

(52) U.S. Cl.
CPC ............. *H04W 4/02* (2013.01); *G01S 5/0252* (2013.01); *G01S 5/0263* (2013.01)

(58) Field of Classification Search
USPC ..................................... 455/456.1
See application file for complete search history.

(56) References Cited

U.S. PATENT DOCUMENTS

| | | | |
|---|---|---|---|
| 8,629,773 B2 | 1/2014 | Rhie et al. | |
| 8,649,800 B2 | 2/2014 | Kalliola et al. | |
| 2006/0044147 A1* | 3/2006 | Knox | G01S 3/32 340/686.1 |
| 2010/0130229 A1 | 5/2010 | Sridhara et al. | |
| 2012/0013475 A1 | 1/2012 | Farley et al. | |
| 2014/0329543 A1* | 11/2014 | Hayashi | H04M 1/7253 455/456.1 |

(Continued)

FOREIGN PATENT DOCUMENTS

WO    2005/062066 A2    7/2005

OTHER PUBLICATIONS

Indoor navigation by infsoft—learn more about our indoor navigation solutions, http://www.infsoft.com/Products/Indoor-Navigation, 2015.

*Primary Examiner* — Moustapha Diaby
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method and apparatus for estimating a location in a terminal are provided. The method includes calculating locations of the terminal and a tag, calculating information about movement of the terminal using a motion sensor, and correcting the calculated location of the tag based on information about the movement of the terminal.

21 Claims, 25 Drawing Sheets

(56) References Cited

U.S. PATENT DOCUMENTS

2015/0105099 A1    4/2015  Luo et al.
2015/0248797 A1*  9/2015  Duggan .............. G07C 9/00111
                                                                340/8.1
2015/0331084 A1*  11/2015  Kim ...................... G01S 5/0257
                                                                 367/119

\* cited by examiner

| Preamble (110) | Signal Field | Service Field | Data Field (MAC Header + Payload) | Tail & Padding |
|---|---|---|---|---|
| 16us | 4us | 16bit | Variable(~5ms) | |

FIG.1A

| Preamble (112) | Access Address | Packet Data Unit (PDU) | CRC |
|---|---|---|---|
| 1Byte | 4Byte | Variable(8~39Byte) | 3Byte |

METHOD AND APPARATUS FOR ESTIMATING LOCATION IN A TERMINAL

CROSS-REFERENCE TO RELATED APPLICATION(S)

This application claims the benefit under 35 U.S.C. § 119(a) of a Korean patent application filed on Jan. 5, 2016 in the Korean Intellectual Property Office and assigned Serial number 10-2016-0001140, the entire disclosure of which is hereby incorporated by reference.

TECHNICAL FIELD

The present disclosure relates to a method and apparatus for estimating a location in a terminal.

BACKGROUND

The Internet has been evolving from a human-oriented connection network over which users generate and consume information to an Internet of things (IoT) over which distributed components exchange information with each other and process the information. Convergence between a big data processing technology based on connectivity to a cloud server or the like and the IoT technology has emerged as an Internet of everything (IoE) technology. To implement the IoT, technology elements such as sensing, wired/wireless communication and network infrastructure, service interface, and security techniques are required. Nowadays, techniques such as a sensor network for connection between things, machine to machine (M2M) communication, and machine type communication (MTC) are being researched.

An intelligent Internet technology (IT) service may be provided, which creates new values for users' lives by collecting and analyzing data generated from connected things in an IoT environment. The IoT may find its applications in a wide range of fields including smart home, smart building, smart city, smart car or connected car, smart grid, healthcare, smart home appliances, high-tech medicine, and the like.

If a user wants to locate his or her things (e.g., a bag) in a shop selling goods, or in an airport, the global positioning system (GPS) is widely used. Although the GPS is available in a wide area, GPS is not viable in a place which satellite signals do not reach, such as indoors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for using a direction measurement function of a terminal, calculating a direction angle to an object or a product through an antenna of the terminal, and estimating a relative direction to the thing or the product based on the calculated direction angle.

Another aspect of the present disclosure is to provide a method and apparatus for searching tagged object and accurately measuring the direction and location of a thing based on a change in the inclination of a terminal during the search.

Another aspect of the present disclosure is to provide a method and apparatus for accurately estimating the location of a thing in a terminal.

Another aspect of the present disclosure is to provide a method and apparatus for accurately estimating a direction to an object in a terminal.

Another aspect of the present disclosure is to provide a method and apparatus for minimizing installation cost involved in estimation of the location of an object or a direction to the object in a terminal.

Another aspect of the present disclosure is to provide a method and apparatus for performing positioning in real time.

In accordance with an aspect of the present disclosure, a method for estimating a location in a terminal is provided. The method includes calculating locations of the terminal and a tag, calculating information about movement of the terminal using a motion sensor, and correcting the calculated location of the tag based on information about the movement of the terminal.

In accordance with another aspect of the present disclosure, an apparatus for estimating a location in a terminal is provided. The apparatus includes a controller configured to calculate locations of the terminal and a tag, calculate information about movement of the terminal using a motion sensor, and correct the calculated location of the tag based on information about the movement of the terminal.

In accordance with another aspect of the present disclosure, a method for estimating a location in an access point is provided. The method includes receiving a beacon signal from a tag, determining information about a distance to the tag, transmitting the determined information about the distance to a terminal, and receiving, from the terminal, information about a location of the tag corrected based on information about movement of the terminal and the information about the distance.

In accordance with another aspect of the present disclosure, an apparatus for estimating a location in an access point is provided. The apparatus includes a receiver configured to receive a beacon signal from a tag, and a configured to determine information about a distance to the tag, and transmit the determined information about the distance to a terminal, wherein the receiver is further configured to receive, from the terminal, information about a location of the tag corrected based on information about movement of the terminal and the information about the distance.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 1A and 1B illustrate structures of packets based on wireless local area network (WLAN) according to an embodiment of the present disclosure;

Throughout the drawings, like reference numerals will be understood to refer to like parts, components, and structures.

DETAILED DESCRIPTION

Figure 2A:
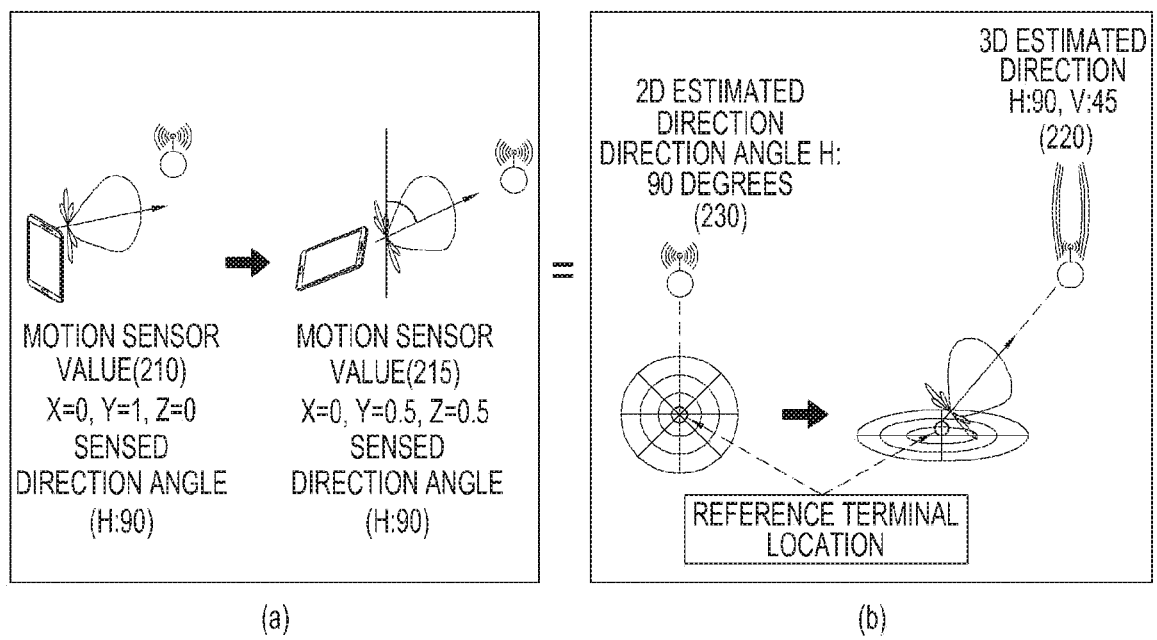
FIG. 2A is a view illustrating a method for estimating a location in a terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used in the present disclosure are provided to describe merely specific embodiments, and are not intended to limit the scope of other embodiments of the present disclosure. It is to be understood that singular forms include plural referents unless the context clearly dictates otherwise. In the present disclosure, the term 'have', 'may have', 'include', or 'may include' signifies the presence of a specific feature, number, operation, component, or part, or their combination, not excluding the presence or addition of one or more other features, numbers, operations, components, or parts, or a combination thereof.

Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

The following description covers systems, methods, techniques, command sequences, and computer program products with which technologies essential to the present disclosure are implemented. However, it is to be understood that the described specific examples can be practiced without their specific detailed description. For example, although embodiments are related to use of wireless local area network (WLAN) techniques between an access point (AP) and a terminal, the embodiments are not limited to the WLAN techniques. Obviously, other appropriate communication standards and technologies (e.g., cellular communication) may be used in other embodiments of the present disclosure.

An AP, which is described below, is a mutual AP between a wireless communication network and a terminal and may be a base station (BS) or a relay. The wireless communication network may include a 3rd generation (3G) network, a 4th generation (4G) network, a wireless fidelity (Wi-Fi) network, a Bluetooth (BT) network, a near field communication (NFC) network, an ultra wideband (UWB) network, and the like. Further, an AP and a terminal may include directional antennas.

The terminal is an entity that accesses an AP by wireless communication. The terminal may be a user equipment (UE), a smartphone, a computer, or a multimedia system with communication functionality.

Various embodiments of the present disclosure cover 60-GHz millimeter wave (mmWave) communication as a wireless data transmission technique, a technique for determining the locations of terminals, that is, the distances and directions of the terminals using the mmWave technology, a technique for managing a protocol level for locating terminals, a user experience (UX) for providing intuition required for connection establishment to users based on the protocol level management technique, and services available to the users through the UX. The 60-GHz mmWave technology is one technology for transmitting and receiving data between users, equivalent to Wi-Fi in 2.4/5 GHz. With this technology, the two-dimensional (2D) locations of devices within a short range may be estimated very accurately during initial setup between terminals.

According to an embodiment of the present disclosure, a terminal may be a portable electronic device with wireless access functionality, such as a smartphone. In another example, a terminal may be one of a portable terminal, a mobile phone, a mobile pad, a media player, a tablet computer, a handheld computer, a wireless accessible camera, a smart television, and a personal digital assistant (PDA). In another example, a terminal may be a device in which functions of two or more of the above devices are combined.

In an embodiment of the present disclosure, a wireless communication system may be a device to device (D2D) network. In another example, the wireless communication system may be a local area network (LAN). A UX is created based on the accurately estimated locations of devices within a short range, so that a user may select a target device for initial connection setup and data transmission. This is defined as a device map.

The device map is generated based on collected information, and represents a relative location of a receiving device based on the location and direction of a transmitting device. The device map may be a 2D or three-dimensional (3D) map. The device map may be updated periodically and thus reflect a location tracking result of the receiving device periodically. The device map may update the relative location of the receiving device in real time according to the direction of the transmitting device.

According to an embodiment of the present disclosure, the device map includes a radial chart based on distances and directions and information about the location of the terminal indicated on the radial chart. The information about the location of an adjacent terminal includes distance information and direction information.

According to an embodiment of the present disclosure, a terminal searches for distance information and direction information indicating the direction of a tag attached onto an object. Distance information about an adjacent terminal may be detected by estimating a time taken for a predetermined signal to arrive at the adjacent terminal. The strength or phase of a signal transmitted to or received from the adjacent terminal or the tag attached onto the object in one or more beam directions may be measured and the direction information about the adjacent terminal detected based on the measured signal strength or phase.

A wireless positioning technique used in an embodiment of the present disclosure refers to measuring the location of an object by cell-identifier (Cell-ID), time of arrival (ToA), time difference of arrival (TDoA), angle of arrival (AoA), finger printing, or the like using a wireless communication infrastructure such as code division multiple access (CDMA), WLAN, UWB, or the like.

The term as used below, "determine" may mean a variety of actions. For example, "determine" may mean calculate, compute, process, derive, examine, search (e.g., a table, a database, or any other data structure), confirm, and the like. Also, "determine" may mean receive (e.g., information), access (e.g., data in a memory), and the like. Further, "determine" may mean solve, select, choose, configure, and the like.

FIGS. 1A and 1B illustrate WLAN-based packet structures according to an embodiment of the present disclosure.

Referring to FIG. 1A, a Wi-Fi packet structure is illustrated. A Wi-Fi packet 100 includes a Preamble 110, a Signal field, a Service field, a Data field, and a Tail and Padding field. The gain and phase of a phase array antenna are controlled according to the direction of the received Wi-Fi packet 100 using the 16-μsec preamble 110 at the start of the Wi-Fi packet 100. A direction angle may be determined using the gain and phase acquired during the duration of the preamble 100. The Signal field, the Service field, the Data field, and the Tail and Padding field are not related to the present disclosure and thus will not be described in detail herein.

Referring to FIG. 1B, a structure of a Bluetooth low energy (BLE) beacon frame is illustrated.

BLE is a low-power, low-cost wireless communication technology in which a terminal located within a short range recognizes a beacon by a BT signal and information is provided to or received from the terminal in a place having a beacon.

A BLE beacon frame 120 includes a short training field (STF) 122, a channel estimation field (CEF) 124, a Header, and Payload.

The STF 122 is used for synchronization acquisition and configured by repeating a Golay sequence block.

The CEF 124 is used for channel estimation and configured by combining two Golay sequences. The CEF 124 is the most important part to calculation of the direction angle and distance of a line-of-sight (LOS) path.

The Header carries ID information about a transmitting device.

Among direction angle estimation algorithms, a spectral algorithm is a scheme of estimating, as the incident direction of a signal, a direction angle having a peak value in a spectrum with an incident direction as a variable. Spectral algorithms are divided into a beamforming algorithm and a subspace algorithm depending on how a spectrum is defined and a peak point is detected.

The beamforming algorithm is one of most basic direction angle estimation schemes using an array antenna. The array antenna is steered in all directions, a spatial spectrum is formed with output values, and the incident direction of a signal is determined to be a location with a peak value. The output of the array antenna is a linear combination of antenna outputs having weights of respective antennas as coefficients. The output y(t) of an array antenna having M elements may be determined by equation 1 below.

$$y(t) = \sum_{i=1}^{M} w_i^* x_i(t) = w^H x(t) \quad \text{Equation 1}$$

$w_m$ represents the weight of an $m^{th}$ antenna, x(t) represents the output of the $m^{th}$ antenna, and * represents a complex conjugate operator. The average output power p(w) of the array antenna may be determined by equation 2.

$$P(w) = E[|y(t)|^2] = w^H E[x(t)x^H(t)]w = w^H R w \quad \text{Equation 2}$$

R represents a covariance matrix. Beamforming algorithms are classified into a Bartlett beamforming algorithm and a Capon beamforming algorithm according to how a weight vector w is determined.

The Bartlett beamforming algorithm is implemented by applying a Fourier transform-based spectrum analysis scheme to an array antenna. A signal output is maximized by heavily weighting a signal incident from a specific direction in the Bartlett beamforming algorithm. To maximize the output of an array antenna for a signal incident from a specific direction θ, a weight vector $w_{BF}$ is calculated by equation 3 in the Bartlett beamforming algorithm.

$$w_{BF} = \frac{a(\theta)}{\sqrt{a^H(\theta)a(\theta)}} \quad \text{Equation 3}$$

α(θ) represents a direction vector of an array antenna response for the specific direction θ. Substitution of equation 3 into equation 2 results in a spatial spectrum of Bartlett beamforming, expressed as equation 4.

$$P_{BF}(\theta) = \frac{a^H(\theta)Ra(\theta)}{a^H(\theta)a(\theta)} \quad \text{Equation 4}$$

The Capon beamforming algorithm assigns a relatively small weight to an interference signal or noise, while maintaining the gain of a signal incident from a specific direction constant. An optimization problem for satisfying this condition is expressed as equation 5.

$$\min_{w} w^H R w \text{ subject to } w^H a(\theta) = 1 \quad \text{Equation 5}$$

The optimization problem depicted in equation 5 increases a signal to noise ratio (SNR) by minimizing the interference signal and noise, while the gain of the specific direction is maintained to be 1. The solution of equation 5 is given as equation 6.

$$w_{MV} = \frac{R^{-1}a(\theta)}{a^H(\theta)R^{-1}a(\theta)} \quad \text{Equation 6}$$

If the above weight vector $w_{MV}$ is substituted into equation 2, a spatial spectrum of Capon beamforming may be given by equation 7.

$$P_{MV}(\theta) = \frac{1}{a^H(\theta)R^{-1}a(\theta)} \quad \text{Equation 7}$$

A multiple signal classification (MUSIC) algorithm is a major subspace-based algorithm that estimates a direction angle. According to a subspace algorithm, a signal subspace and a noise subspace are separated from each other by eigenvalue decomposition of the covariance matrix of an array antenna output, and a direction angle is estimated using information about the subspaces. The MUSIC algorithm relies on the property that an omnidirectional direction vector corresponding to an incident signal is orthogonal to a noise subspace. If L plane waves arrive at an array antenna with M elements, an input signal X may be expressed as equation 8 to equation 11.

$$X = AF + N \quad \text{Equation 8}$$

$$F = [F_1, F_2, \ldots, F_L]^T \quad \text{Equation 9}$$

$$A = [a(\theta_1), a(\theta_2), \ldots, a(\theta_L)] \quad \text{Equation 10}$$

$$a(\theta_L) = \begin{bmatrix} \exp\left(j2\pi\frac{d_1}{\lambda}\sin(\theta_L)\right) \\ \vdots \\ \exp\left(j2\pi\frac{d_M}{\lambda}\sin(\theta_L)\right) \end{bmatrix} \quad \text{Equation 11}$$

A represents a direction matrix, $\alpha(\theta_L)$ represents a direction vector, $F_L$ and $\theta_L$ represent the complex amplitude and direction angle of an $L^{th}$ wave, respectively, λ, represents a wavelength, $d_M$ represents the distance from a reference element to each element, and N represents thermal noise. A covariance matrix using equation 8 may be expressed as equation 12.

$$R = E[XX^H] = AE[FF^H]A^H + E[NN^H] = ASA^H + \sigma^2 I \quad \text{Equation 12}$$

S represents the covariance matrix of F, and $\sigma^2$ represents thermal noise power.

A tag or a wireless transmission/reception device may transmit a wireless signal to a terminal in a wireless communication scheme. The wireless communication scheme may be any of Wi-Fi, 802.11ad, or beacon communication. The terminal may receive the wireless signal and measure a distance using the received signal strength indicator (RSSI) of the received signal. An RSSI is an index representing the strength of a received signal. The same wireless signal has an equal RSSI value for the same distance in an ideal environment free of noise. The RSSI is expressed in dBm, and a higher RSSI represents a greater signal strength. Since the RSSI of a signal is inversely proportional to the square of a distance, as the distance increases, the signal gets weaker. The terminal may measure the distance between the tag or the wireless transmission/reception device and the terminal based on this RSSI property.

FIG. 2A is a view illustrating a method for estimating a location in a terminal according to an embodiment of the present disclosure.

Referring to FIG. 2A, the method is applicable to a 3D array antenna system. The 3D array antenna system estimates a location using an X coordinate, a Y coordinate, and a Z coordinate (hereinafter, referred to as X, Y, and Z axes) or (a horizontal direction angle, a vertical direction angle, and a distance from a terminal to a tag). The distance between the terminal and the tag is calculated using RSSI information received from the tag.

FIG. 2A is based on the assumption that a terminal experiences no location change and an inclination change and the location of a tag is not changed. In FIG. 2A, the X, Y, and Z axes represent a motion sensor value of the terminal.

Referring to (a) of FIG. 2A, it is assumed that a motion sensor value 210 prior to movement of the terminal is, for example, (X=0, Y=1, Z=0) and a motion sensor value 215 after the movement of the terminal is, for example, (X=0, Y=0.5, Z=0.5). For example, it may be assumed that if X=0, Y=1, and Z=0, the terminal is placed upright on a plane, and if X=0, Y=0.5, and Z=0.5, the terminal is placed with its screen facing upward.

Referring to (b) of FIG. 2A, it is assumed that a horizontal angle is 90 degrees (H: 90) as an estimated 2D direction angle 230 sensed by the terminal prior to the movement of the terminal, and a horizontal angle and a vertical angle are 90 degrees and 45 degrees (H: 90, V: 45), respectively as an estimated 3D direction angle 220 sensed by the terminal after the movement of the terminal.

The direction angle (H: 90) sensed using a motion sensor value illustrated in (a) of FIG. 2A is estimated to be different from the direction angle estimated by scanning from the 2D direction angle (H: 90) to the 3D direction angle (H: 90, V: 45).

Figure 2B:
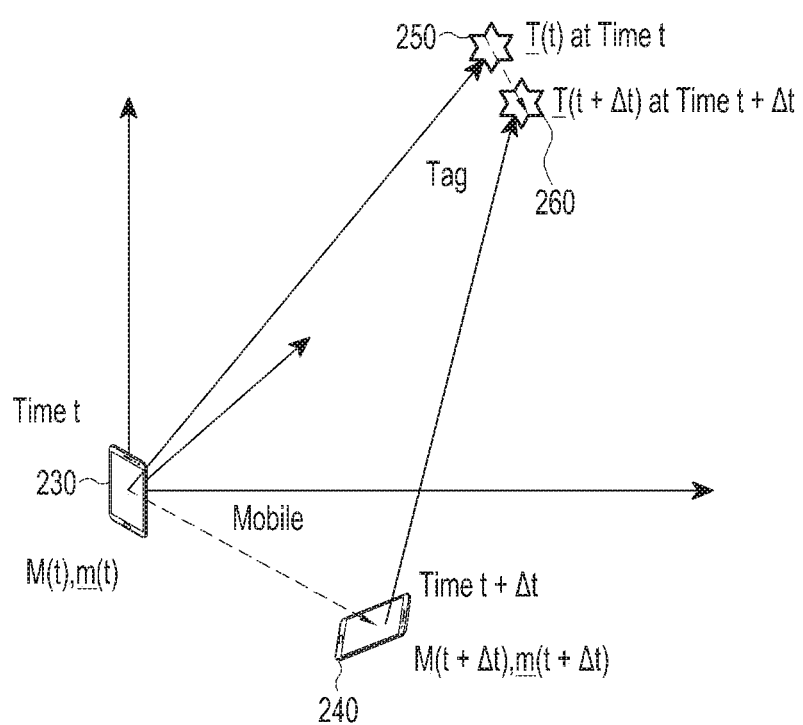
FIGS. 2B and 2C are views illustrating a method for estimating a location in a terminal according to an embodiment of the present disclosure.
Figure 2C:
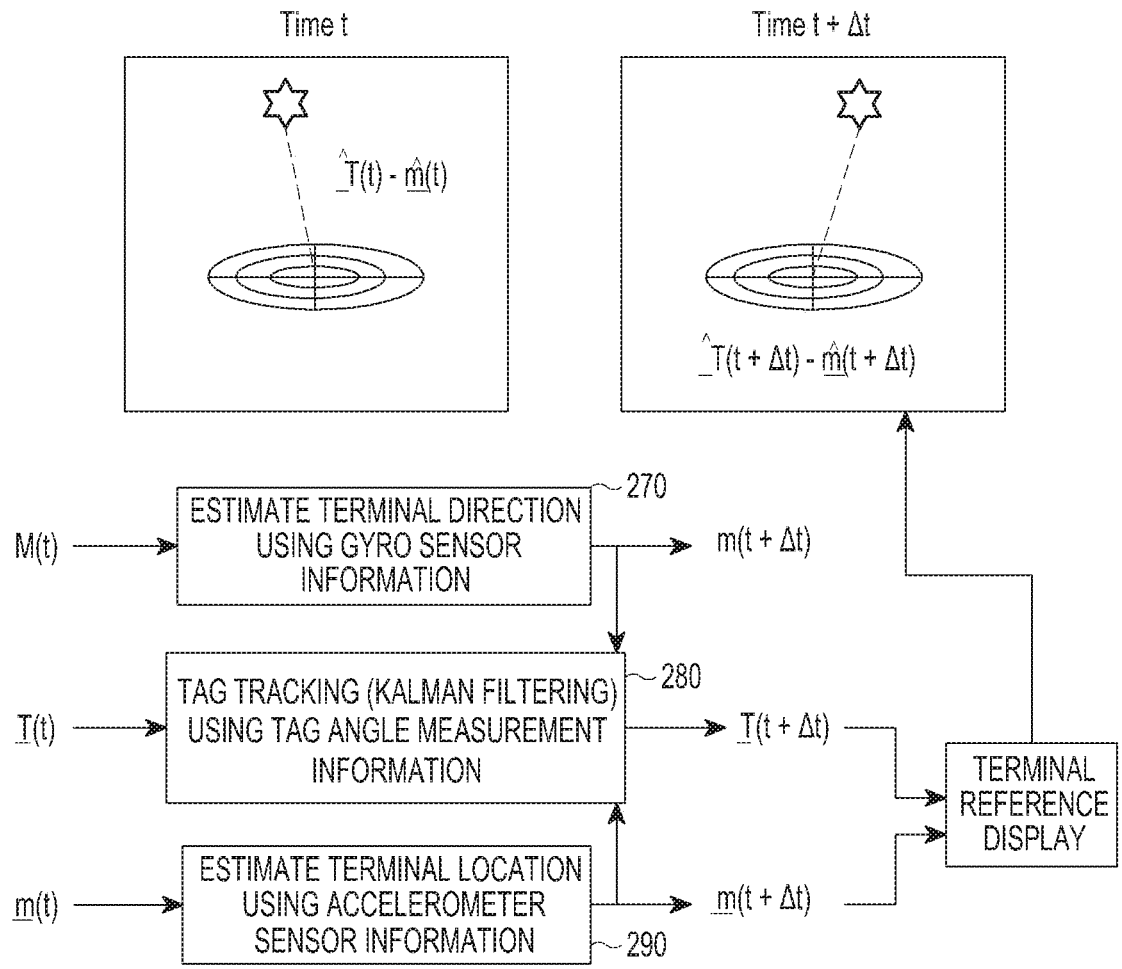

FIGS. 2B and 2C are views illustrating a method for estimating a location in a terminal according to another embodiment of the present disclosure.

Referring to FIGS. 2B and 2C, the views are based on the assumption that a terminal experiences a location change and an inclination change, and the location of a tag is changed.

The movement direction (distance) of the tag is measured using a gyro sensor and an accelerometer sensor. If variations in the locations of the tag and the terminal incurred by the movement of the tag are calculated, and an angle φ between the terminal before the movement and the terminal after the movement is determined at the moved position of the terminal with respect to the tag is determined using the location variations, the direction angle of the tag is corrected using a trigonometric function based on the angle φ.

Reference numeral 230 denotes the terminal before movement, and reference numeral 240 denotes the terminal after the movement. Reference numeral 250 denotes the tag before movement, and reference numeral 260 denotes the tag after the movement.

m(t), T(t), and M(t) denote parameters used in FIGS. 2B and 2C. m(t) represents the location of the terminal determined based on accelerometer sensor information, and T(t) represents the location of a target, that is, the tag. The location of the tag is tracked using tag angle measurement information. Kalman filtering is used to track the location of the tag.

M(t) represents the direction of the terminal determined using the gyro sensor.

m(t) at time t+Δt is represented as m(t+Δt), T(t) at time t+Δt is represented as T(t+Δt), and M(t) at time t+Δt is represented as M(t+Δt).

A location is corrected by $\hat{T}(t)-\hat{m}(t)$ at time t, and by $\hat{T}(t+\Delta t)-\hat{m}(t+\Delta t)$ at time t+Δt.

The terms "direction angle" and "inclination" may be interchangeably used with each other. "Sense" means acquisition of information by a sensing technology.

According to an embodiment of the present disclosure, the terminal corrects the location of the tag using the motion sensor value 215 by Kalman filtering. The tag is attached onto an item in a shop or a checked-in item to be claimed in an airport. The tag includes a wireless transmission/reception device. The tag stores information about an item to which the tag is attached or information about an item or person related to the tag.

According to another embodiment of the present disclosure, the terminal may correct the location of the tag based on the direction angle of the terminal by Kalman filtering.

Figure 3:
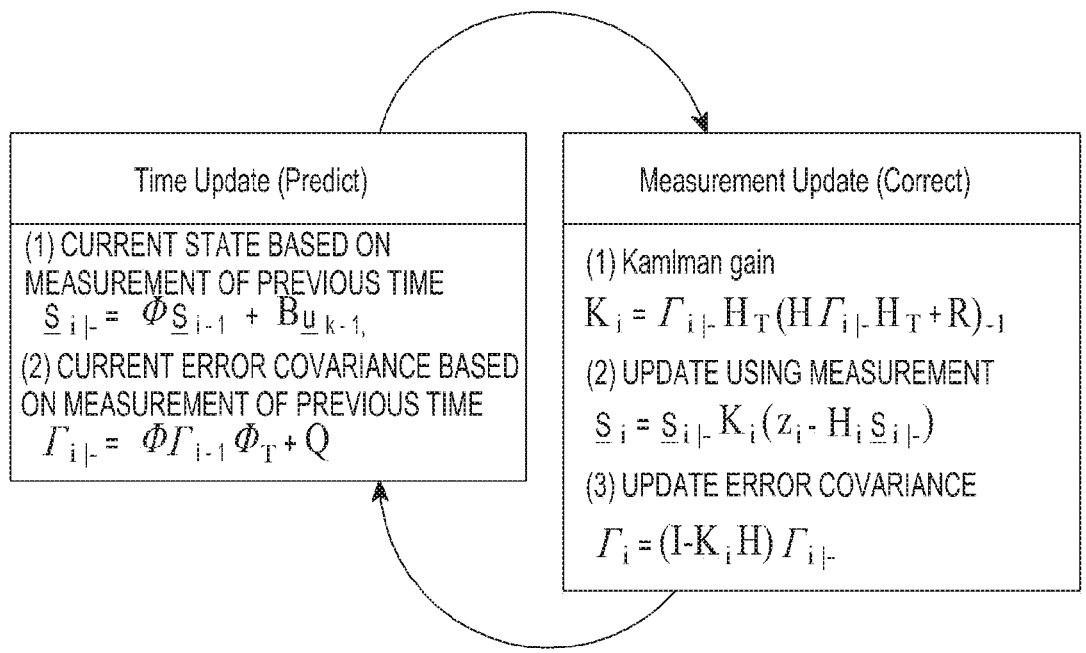
FIG. 3 is a view illustrating Kalman filtering applied to an object according to an embodiment of the present disclosure.

FIG. 3 illustrates Kalman filtering applied to an object according to an embodiment of the present disclosure.

Referring to FIG. 3, in Kalman filtering, a location estimate for a next time is achieved by updating a location estimate of a signal source at a specific time. For the update, a new measurement is used. To determine the location of the signal source, a standard Kalman filter or an extended Kalman filter (EKF) may be used. The standard Kalman filter is optimized in that it minimizes a mean-squared error.

A state vector is denoted by $s_i$ and a measurement vector is denoted by $z_i$. $\hat{s}_{i-}$ a prior state estimate at instant i and $\hat{s}_i$ a post state estimate at instant i. Prior and post are distinguished depending on whether the measurement vector $z_i$ is used at instant i. Errors of the prior state estimate and the post state estimate are defined as equation 13 and equation 14, respectively.

$$e_{i-} \equiv s_i - \hat{s}_{i-} \qquad \text{Equation 13}$$

$$e_i \equiv s_i - \hat{s}_i \qquad \text{Equation 14}$$

Related error covariance matrices for which weights are taken into account are given as equation 15 and equation 16, respectively.

$$\Gamma_{i-} = \varepsilon\{e_{i-} W e_{i-}^T\} \qquad \text{Equation 15}$$

$$\Gamma_i = \varepsilon\{e_i W e_i^T\} \qquad \text{Equation 16}$$

The Kalman filter represents the post state estimate as a linear combination of the prior state estimate and a difference. The difference refers to the difference between the actual measurement $z_i$ and a predicted measurement $H\hat{s}_{i-}$.

$$\hat{s}_i = \hat{s}_{i-} + K(z_i - H\hat{s}_{i-}) \qquad \text{Equation 17}$$

In equation 17, the difference ($z_i - H\hat{s}_{i-}$) between the prior estimate and the post estimate, determined by the current measurement, is called an innovation. A matrix K that minimizes the post error covariance matrix is selected.

$$K_i = \Gamma_{i-} H^T (H \Gamma_{i-} H^T + R)^{-1} \qquad \text{Equation 18}$$

The standard Kalman filter is configured as follows.
State Prediction:

$$\hat{s}_{i-} = \Phi \hat{s}_{i-1} + B u_{k-1} \qquad \text{Equation 19}$$

Prediction of covariance matrix of state:

$$\Gamma_{i-} = \Phi \Gamma_{i-1} \Phi^T + Q \qquad \text{Equation 20}$$

Kalman gain matrix computation:

$$K_i = \Gamma_{i-} H^T (H \Gamma_{i-} H^T + R)^{-1} \qquad \text{Equation 21}$$

Update state equation:

$$\hat{s}_i = \hat{s}_{i-} + K_i (z_i - H_i \hat{s}_{i-}) \qquad \text{Equation 22}$$

Update covariance matrix of states:

$$\Gamma_i = (I - K_i H) \Gamma_{i-} \qquad \text{Equation 23}$$

Initialization:

$$s_{0-} = \varepsilon\{s_0\} \Gamma_{0-} = cov\{s_0\} \qquad \text{Equation 24}$$

A Kalman filter equation is divided into a time update equation and a measurement update equation.

The time update equation is given as $\hat{s}_{i-} = \Phi \hat{s}_{i-1} + B u_{k-1}$, $\Gamma_{i-} = \Phi \Gamma_{i-1} \Phi^T + Q$. The time update equation indicates progress from the post state using a measurement of the previous time to the prior state before a measurement at the current time is used. The measurement update equation is given as equation 25.

$$\hat{s}_i = \hat{s}_{i-} + K(z_i - H\hat{s}_{i-}), \Gamma_i = (I - K_i H)\Gamma_{i-}$$ Equation 25

The measurement update equation indicates transition from a prior state before the measurement of the current time is used to a post state after the measurement of the current time is used. That is, an improved post estimate is calculated by combining a prior estimate with a new measurement.

Sensors applied to an embodiment of the present disclosure are defined below.

Various motion sensors for sensing motions in a free space have been used in vehicles, aircrafts, ships, and the like for the past tens of years. However, the size, power consumption, and price of a motion sensor are obstacles to application of the motion sensor to consumer appliances. Although there are other commercialized motion sensor techniques, the following four basic motion sensors are closely related to the market of consumer appliances.

An accelerometer sensor (G-sensor) measures a linear acceleration and an inclination angle. A single-axis or multi-axis accelerometer sensor senses a size, linearity, rotation, and acceleration directions of gravity in combination. The accelerometer sensor usually provides a restricted motion sensing function. For example, an equipment with a built-in accelerometer sensor may sense only rotation between a horizontal direction and a vertical direction at a fixed position. As a result, the accelerometer sensor is used mainly for the purpose of measuring a simple rotation such as rotation of a screen of a mobile equipment from a longitudinal direction to a latitudinal direction or a gravity-related equipment.

A gyroscope (gyro sensor) measures a variation of a single-axis or multi-axis rotational motion. The gyro sensor may measure rotation and a direction with respect to a reference axis accurately and precisely despite a complex motion. Also, the gyro sensor operates independently without being affected by an external force such as gravity or a magnetic field, unlike an accelerometer sensor and a geomagnetic sensor. The gyro sensor is used as a main sensor that senses a motion in a consumer appliance.

A geomagnetic sensor (electronic compass) is used to measure an absolute direction using a geomagnetic field and indicate an accurate direction on a map preserved in a navigator. The geomagnetic sensor is also used to provide direction information. However, since the geomagnetic field is weak, sensor data is vulnerable to other adjacent magnetic components. Thus, the geomagnetic sensor requires frequent correction to maintain accuracy.

A pressure sensor (atmospheric pressure meter) measures relative and absolute altitudes based on a change in atmospheric pressure. In a consumer appliance, a pressure sensor is used to measure the altitude of a floor or a change in altitude.

Figure 4:
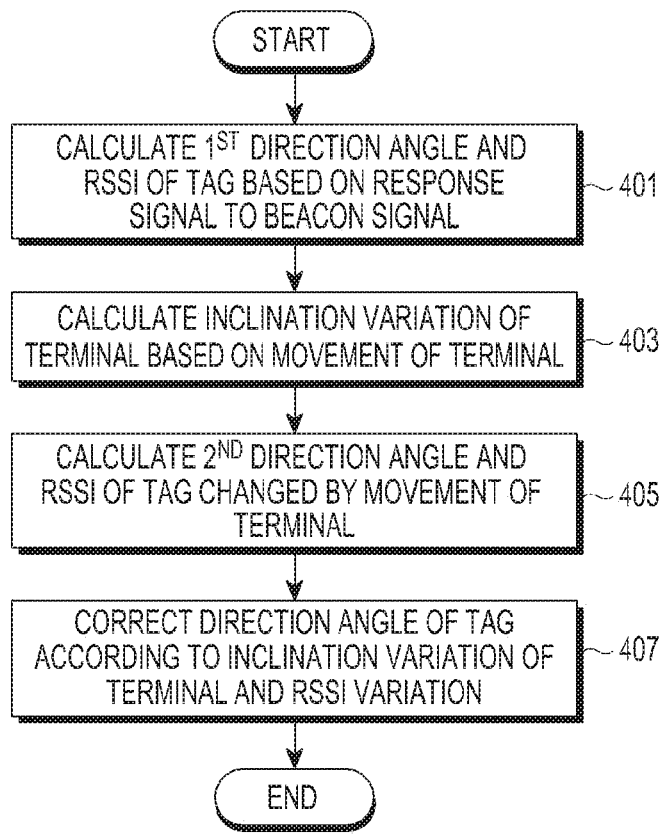
FIG. 4 is a flowchart illustrating a method for estimating a location in a terminal according to an embodiment of the present disclosure.

FIG. 4 is a flowchart illustrating a location estimation method in a terminal according to an embodiment of the present disclosure.

Referring to FIG. 4, the terminal receives a beacon signal from an AP and calculates a first direction angle and RSSI of a tag based on a response signal to the beacon signal in operation 401. The first direction angle of the tag may be tracked using tag angle measurement information (e.g., a DoA).

In operation 403, the terminal calculates a variation in the inclination of the terminal based on movement of the terminal. A variation in the inclination of a motion sensor is sensed using at least one of a gyro sensor and an accelerometer sensor. The direction angle is determined based on an inclination variation of the motion sensor. The direction angle refers to a three-axis (X-axis, Y-axis, and Z-axis) direction angle of a multi-array antenna in the terminal. For example, if the X-axis, Y-axis, and Z-axis values are (0, 1, 0), a portrait mode is determined. If the X-axis, Y-axis, and Z-axis values are (−1, 0, 0), a landscape mode is determined. The portrait mode refers to a horizontal angle, and the landscape mode refers to a vertical angle. The inclination variation may be determined using only the X-axis, Y-axis, and Z-axis values, or a direction angle based on the X-axis, Y-axis, and Z-axis values and the state of the terminal. The state of the terminal (or movement of the terminal) may be sensed by the gyro sensor. Relative direction information between the terminal and the tag may be sensed using the gyro sensor.

The terminal calculates a second direction angle and RSSI of the tag, which have been changed by the movement of the terminal in operation 405. In operation 407, the terminal corrects the direction angle of the tag based on the variation of the inclination of the terminal and the RSSI variation.

A method for calculating an inclination in the case of using an accelerometer sensor and an angular speed sensor is described below.

(1) The accelerometer sensor measures a dynamic force such as the acceleration, vibration, and impact of an object by processing an output signal. Because the accelerometer sensor is capable of sensing the movement state of an object elaborately, the accelerometer sensor is used in a wide range of fields for many usages. The accelerometer sensor is essential to transport means including a vehicle, a train, a ship, and an aircraft, and a control system such as factory automation and a robot. An accelerometer sensor built in a communication device becomes thinner and smaller, and various types of accelerometer sensors are available. Accelerometer sensors are classified into an inertia type, a gyro type, and a silicon semiconductor type depending on their detection schemes. A Richter scale or a clinometer may be regarded as a kind of accelerometer sensor.

(2) A geomagnetic sensor is an electronic compass that senses a direction angle using the Earth's magnetic field. The geomagnetic sensor serves the usages of location tracking, 3D gaming, and compass and is used in a portable phone, a walkie-talkie, a GPS device, a PDA, and a navigator. The geomagnetic sensor is installed at the center of a loop which is robust against the residual magnetic field of a steel plate of the body of a vehicle and the magnetic field of an electric part of the vehicle.

(3) A gyro sensor detects an angular speed (how fast an angle moves for 1 second). If a moving object (or an object having a speed) rotates, Coriolis force is applied perpendicularly to the speed direction of the object. The gyro sensor detects an angular speed relying on this physical phenomenon. In general, the gyro sensor outputs an analog signal. The analog signal is converted to a digital signal by an analog to digital (A/D) converter and processed by a controller. An angle may be calculated by integrating detected angular speeds in the controller.

Figure 5:
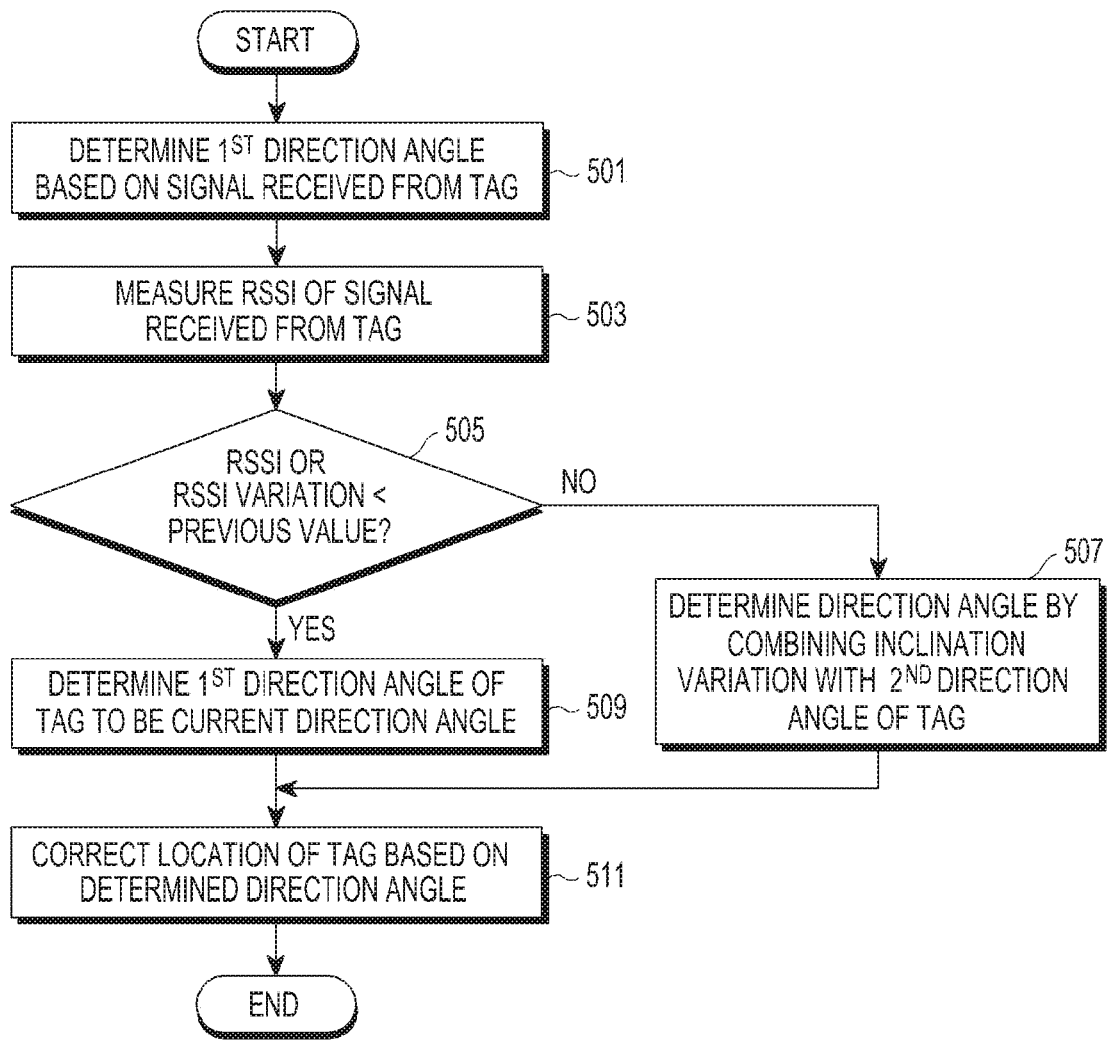
FIG. 5 is a flowchart illustrating a method for estimating a location in a terminal according to an embodiment of the present disclosure.

FIG. 5 is a flowchart illustrating a location estimation method in a terminal according to an embodiment of the present disclosure.

Referring to FIG. 5, the terminal determines a first direction angle based on a signal received from a tag in operation 501 and measures the RSSI of the received signal in operation 503.

In operation 505, the terminal compares the RSSI or an RSSI variation with a previous value. Operation 505 is performed to determine a beamforming angle based on movement of the terminal. If the RSSI or the RSSI variation is equal to or larger than the previous value, the terminal determines a current direction angle by combining the direction angle of the tag after the inclination of the terminal is changed (including distance movement) and the variation of the inclination of the terminal in operation 507. Subsequently, the terminal corrects the location of the tag based on the determined direction angle in operation 511.

If the motion sensor value of the terminal is (0, 1, 0), the inclination variation of the terminal is vertical 90 degrees due to an inclination change (0, 0.5, 0.5), and the second direction angle of the tag is still horizontal 90 degrees equal to the first direction angle of the tag determined based on a DOA, in (a) of FIG. 2A, an RSSI or RSSI variation based on the inclination variation of the terminal (V: 90) is compared with a previous value. If the RSSI is equal to or larger than the previous value, the direction angle of the tag may be determined to a current 3D direction angle (H: 90, V: 90) by combining the second direction angle (H: 90) of the tag with the inclination variation (V: 90).

On the other hand, if the RSSI or RSSI variation is smaller than the previous value, the terminal determines the first direction angle to the current direction angle in operation 509. The angle before the inclination change of the terminal is determined to be the current direction angle. In operation 511, the terminal corrects the location of the tag with the determined direction angle.

Figure 6:
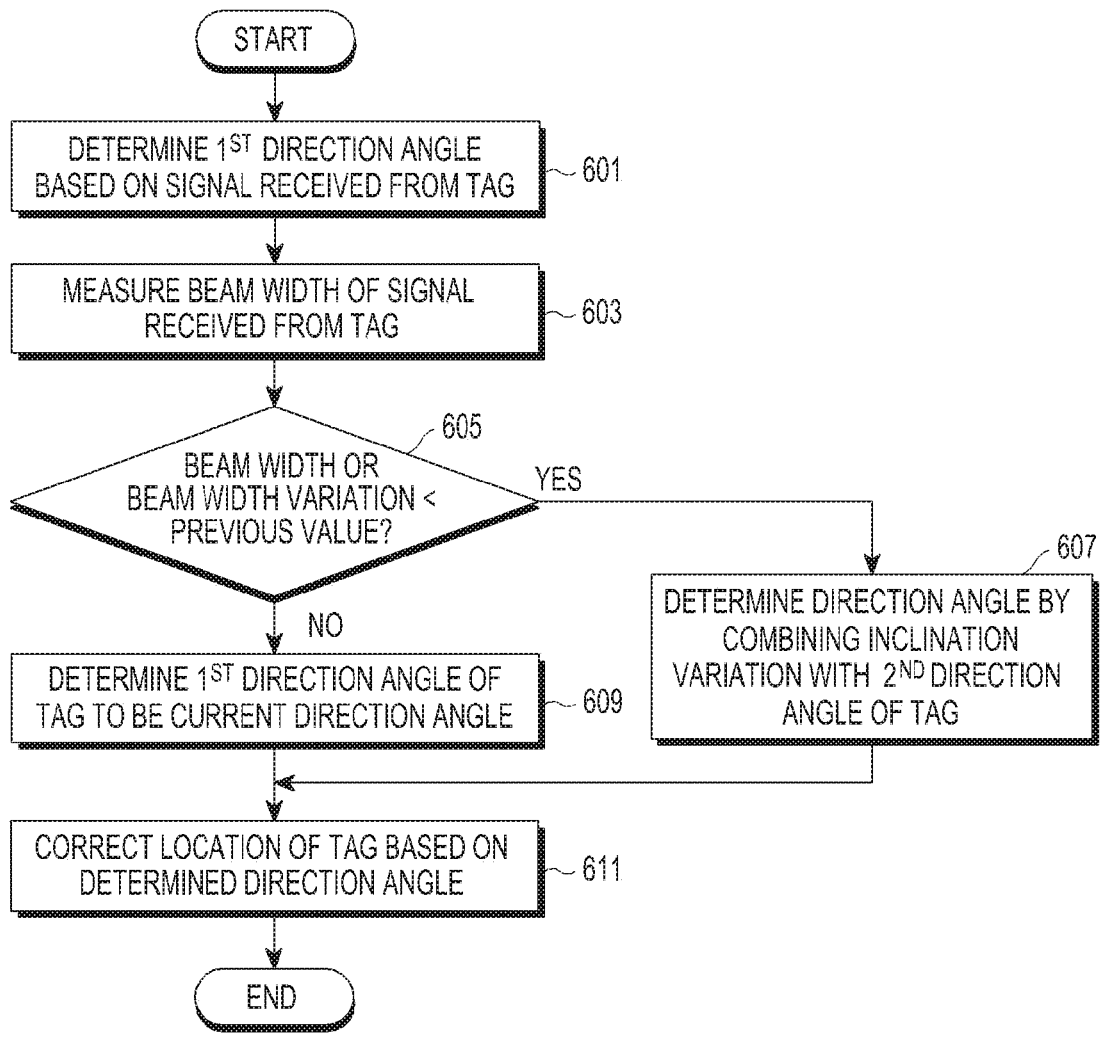
FIG. 6 is a flowchart illustrating a method for estimating a location in a terminal according to an embodiment of the present disclosure.

FIG. 6 is a flowchart illustrating a location estimation method in a terminal according to an embodiment of the present disclosure.

Referring to FIG. 6, the terminal determines a first direction angle based on a signal received from a tag in operation 601 and measures the beam width of the received signal in operation 603.

In operation 605, the terminal compares the beam width or beam width variation of the received signal with a previous value. Operation 605 is performed to determine a beamforming angle based on movement of the terminal.

If the beam width or the beam width variation is equal to or larger than the previous value, the terminal determines a current direction angle by combining the direction angle of the tag after the inclination of the terminal is changed (including distance movement) and the variation of the inclination of the terminal in operation 607. Subsequently, the terminal corrects the location of the tag based on the determined direction angle in operation 611.

If the motion sensor value of the terminal is (0, 1, 0), the inclination variation of the terminal is vertical 90 degrees due to an inclination change (0, 0.5, 0.5), and the second direction angle of the tag is still horizontal 90 degrees equal to the first direction angle of the tag determined based on a DOA, in (a) of FIG. 2A, the beam width or beam width variation of a received signal based on the inclination variation of the terminal (V: 90) is compared with a previous value. If the beam width of the received signal is equal to or larger than the previous value, the direction angle of the tag may be determined to be a current 3D direction angle (H: 90, V: 90) by combining the second direction angle (H: 90) of the tag with the inclination variation (V: 90).

On the other hand, if the beam width or beam width variation is smaller than the previous value in operation 605, the terminal determines the first direction angle of the tag to be the current direction angle in operation 609. The angle before the inclination change of the terminal is determined to be the current direction angle. In operation 611, the terminal corrects the location of the tag based on the determined direction angle.

Figure 7A:
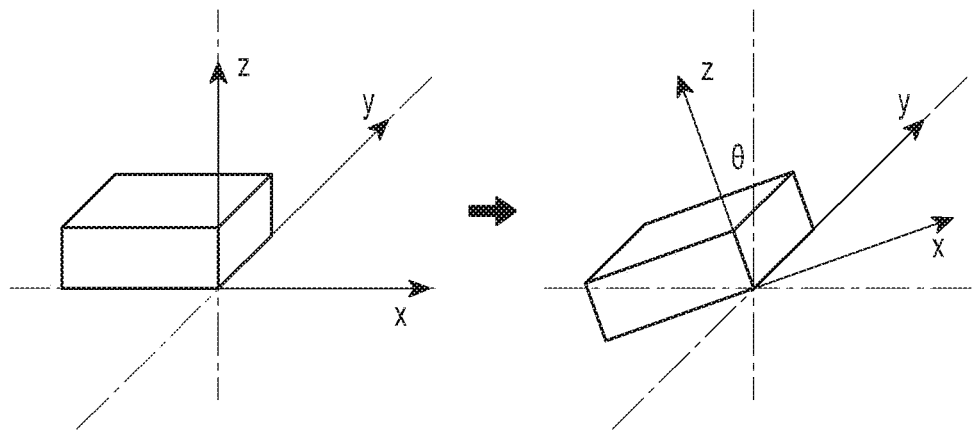
FIGS. 7A and 7B are coordinate diagrams illustrating an angle φ of rotation around the X axis and an angle ρ of rotation around the Y axis, respectively according to an embodiment of the present disclosure.
Figure 7B:
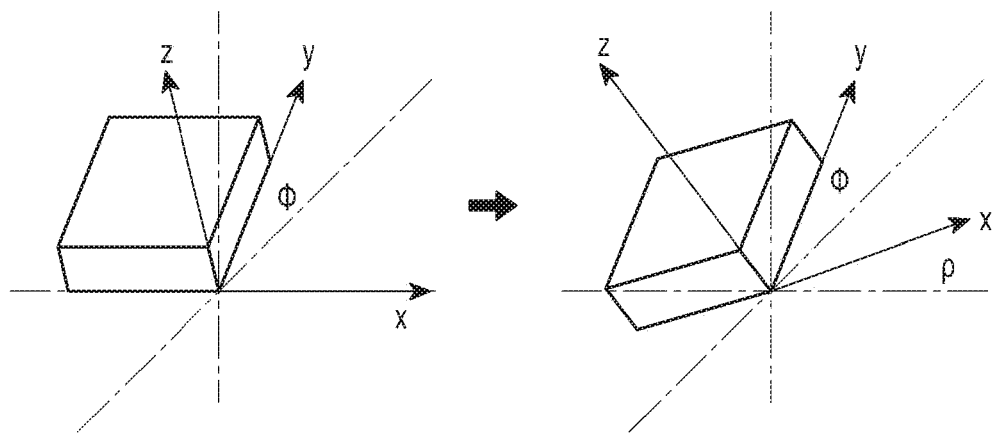

FIGS. 7A and 7B are coordinate diagrams illustrating an angle φ of rotation around the X axis and an angle ρ of rotation around the Y axis, respectively according to an embodiment of the present disclosure.

Referring to FIGS. 7A and 7B, $A_x$, $A_y$, and $A_z$ are accelerations, and $W_x$, $W_y$, and $W_z$ are angular speeds. An acceleration is a variation of a speed per unit time, and an angular speed is a variation of an angle per unit time. In general, an intended acceleration value may be obtained by dividing a data value of an accelerometer sensor by 16384 for normalization and then multiplying the result by 9.8 m/sec$^2$. The measured acceleration value is converted to orientation angles of the sensor using a ratio of each acceleration vector component. The orientation angles may be decomposed into 3-axis angles (Euler angles: roll as an angle of rotation around the X axis, pitch as an angle of rotation around the Y axis, and yaw as an angle of rotation around the Z axis). The angle φ of rotation around the X axis and the angle ρ of rotation around the Y axis may be calculated using the measured acceleration data.

The orientation angles may be expressed as equation 26 using pure acceleration values.

$$\rho = \arctan\left(\frac{A_X}{\sqrt{A_Y^2 + A_Z^2}}\right)$$

$$\phi = \arctan\left(\frac{A_Y}{\sqrt{A_X^2 + A_Z^2}}\right)$$

$$\theta = \arctan\left(\frac{\sqrt{A_X^2 + A_Y^2}}{A_Z}\right)$$

Equation 26

Equation 26 depicts a method for calculating orientation angles or tilt angles using acceleration values. ρ and φ represent X-axis and Y-axis tilt values, respectively. ρ and φ are pitch and roll, and θ is a tilt value with respect to the gravity axis of the Z axis. Thus, θ is not yaw. In this sense, yaw may not be calculated using an accelerometer.

As long as gravity is the only force acting on the sensor, the measurement results of the accelerometer provide accurate orientation angles. However, when the sensor is moved and rotated, forces are applied to the sensor, which causes the measurements to fluctuate. Acceleration data is simple. However, the accelerometer data tends to be very noisy, with significant perturbations. If these can be averaged out, the accelerometer may provide accurate results over timescales longer than the perturbations.

Computing orientation angles from the gyroscope sensor is different from other sensors, since the gyroscope sensor measures an angular velocity (a variation per unit time in an orientation angle), not an angular orientation itself. To compute the orientation angles, a sensor position should be initialized with a known value (possibly from the accelerometer), and then the angular velocity ω around the X, Y and Z axes should be measured at measured intervals Δt. Then ω×Δt=change in angle. The calculated orientation angle will be the original angle plus this change. The problem with this approach is that we are integrating by adding up many small computed intervals to find orientation. Repeatedly adding up increments of ω×Δt will result in small systematic errors.

This is the cause of gyroscopic drift, and over long timescales the gyroscope data will become increasingly inaccurate.

As described above, both the accelerometer data and the gyroscope data are prone to systematic errors. The accelerometer provides accurate data over the long term, but is noisy in the short term. The gyroscope sensor provides accurate data about changing orientation in the short term, but the necessary integration causes the results to drift over longer time scales.

The solution to these problems is to fuse the accelerometer data and the gyroscope data together in such a way that the errors cancel out. A standard method for combining these two inputs is with a Kalman Filter, which is quite a complex methodology. Fortunately, there is a simpler approximation for combining these two data types, called a complementary filter. The following formula combines the accelerometer data and the gyroscope data.

Corrected Angle=α×(Gyroscope Angle)+(1−α)×(Accelerometer Angle)

α=τ(τ+Δ$t$) and (Gyroscope Angle)=(Last Measured Corrected Angle)+ω×Δ$t$

Δt is a sampling rate, τ is a time constant greater than timescale of typical accelerometer noise.

Given a sampling rate of 0.04 seconds and a time constant of 1 second, α≈0.96. The following is the result of using a quaternions method that calculates an orientation angle over 360 degrees, avoiding the Gimbal lock problem.

Pitch, roll and yaw (rotation about the X, Y and Z axes, respectively, also known as Euler angles) have been calculated above. These calculations are limited by certain properties of both the accelerometer and gyroscope. Gyroscope data has a tendency to drift with time, and accelerometer data is noisy and makes it difficult to calculate rotations over ranges greater than 180 degrees. The formulas for computing roll, φ and pitch ρ (you can't compute yaw θ from accelerometer data) from measurements $A_x$, $A_y$, and $A_z$ are:

$$\phi = \arctan\left(\frac{A_X}{\sqrt{A_Y^2 + A_Z^2}}\right)$$ Equation 27

$$\rho = \arctan\left(\frac{A_Y}{\sqrt{A_X^2 + A_Z^2}}\right)$$

The range of the arctanfunction is {−π/2, π/2}, and the range of motion may be detected easily using these functions. Additionally, using Euler angles for the rotation calculations may lead to a problem known as Gimbal lock. Because Euler angle rotations are performed in sequence (e.g., roll, pitch, and then yaw), problems arise when the second rotation in the sequence approaches 90 degrees, because this brings first and third rotation axes into alignment with each other on one plane. This is called "Gimbal lock". Therefore, freedom for the rotation axes is reduced by one degree. The Gimbal lock phenomenon is eliminated by representing a rotation order differently. However, the Gimbal lock phenomenon occurs again during representing a rotation, and the rotation order is changed again. In this context, a principle proposed to eliminate the Gimbal lock phenomenon is quaternions. While the rotation matrix of the Euler angles are expressed with nine elements, the quaternions may be expressed simply with four elements.

A quaternion is composed of three vector components and one scalar component, expressed as equation (28).

$q=\{\eta,\varepsilon\}=\{\eta,\varepsilon_x,\varepsilon_y,\varepsilon_z\}$ Equation 28

η represents the scalar component of the quaternion and $\varepsilon=(\varepsilon_x, \varepsilon_y, \varepsilon_z)$ represents the vector components of the quaternion.

Figure 8:
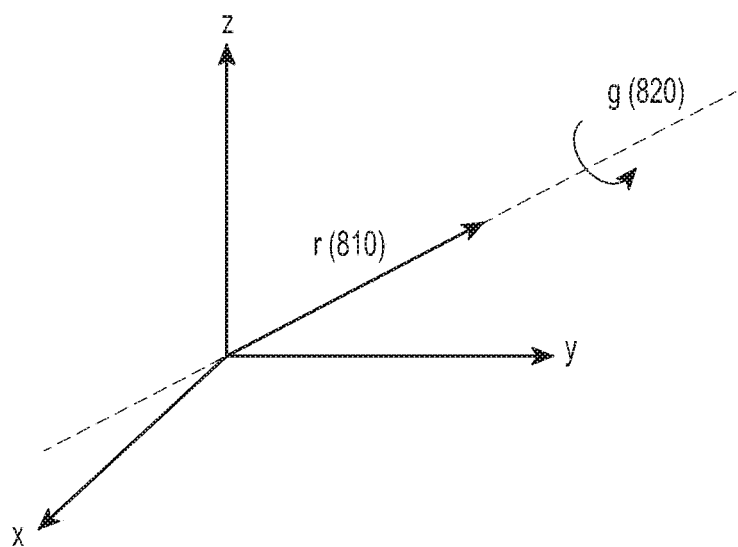
FIG. 8 is a coordinate diagram illustrating a vector quantity with respect to the X, Y, and Z spatial coordinate axes and a scalar quantity of rotation according to an embodiment of the present disclosure.

FIG. 8 is a coordinate diagram illustrating a vector quantity with respect to the X, Y, and Z spatial coordinate axes and a scalar quantity of rotation according to an exemplary embodiment of the present invention.

Referring to FIG. 8, four quaternions are used to define rotation of an object. Three of the quaternions define a vector quantity 810 with respect to the X, Y, and Z spatial coordinate axes, and the other quaternion defines a scalar quantity 820 of rotation. This method is rather complex to be represented mathematically and thus will be excluded herein. The salient points of quaternions are that they avoid the problem of gimbal lock and can represent rotations over ranges of greater than 180 degrees without difficulty. Additionally, quaternions have some useful mathematical properties, such as allowing for straightforward interpolation between two quaternions, which can be useful in animation and reducing round-off error when multiple rotation operations are performed in sequence. There is a digital motion processor (DMP) in the accelerator sensor and the gyro sensor, and the DMP fuses accelerometer data and gyroscope data together to minimize the effects of errors inherent in each sensor. The DMP computes the results in terms of quaternions, and may convert the results to Euler angles. A development software source is provided for converting quaternions stored in a provided multipoint control unit (MCU) chip to Euler angles and enabling the angular trajectory of the accelerometer/gyro sensor to be viewed through a computer.

Figure 9:
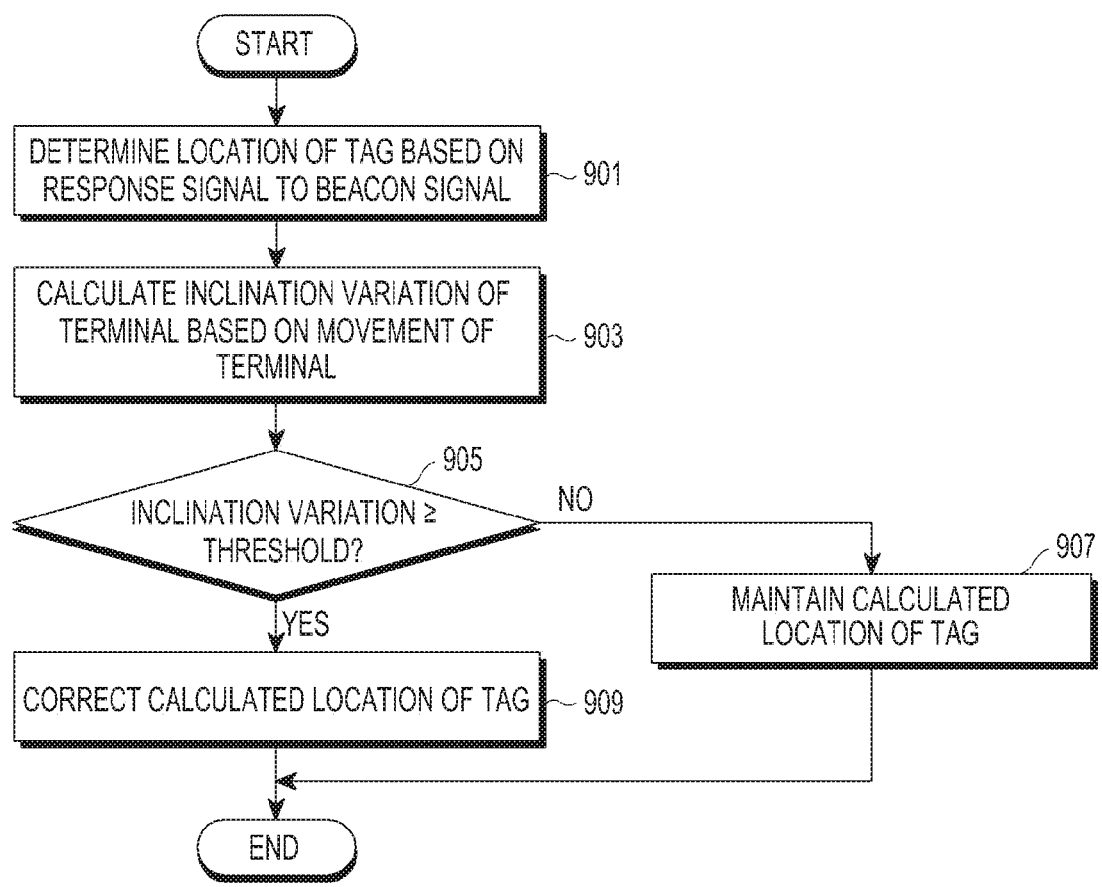
FIG. 9 is a flowchart illustrating a method for estimating a location in a terminal according to an embodiment of the present disclosure.

FIG. 9 is a flowchart illustrating a method for estimating a location in a terminal according to an embodiment of the present disclosure.

Referring to FIG. 9, in operation 901, the terminal receives a beacon signal from an AP and calculates the location of tag based on a response signal to the beacon signal. According to an embodiment of the present disclosure, the location of the tag may be calculated based on the distance between the terminal and the tag. The location of the tag may be tracked using tag angle measurement information (e.g., DoA), as described above with reference to FIG. 2B.

The terminal calculates a variation in the inclination of the terminal based on movement of the terminal in operation 903. A direction angle is determined using an inclination variation of a motion sensor. For example, if the X-axis, Y-axis, and Z-axis values are (0, 1, 0), the portrait mode is determined. If the X-axis, Y-axis, and Z-axis values are (−1, 0, 0), the landscape mode is determined. The portrait mode refers to a horizontal angle, and the landscape mode refers to a vertical angle. Once the X-axis, Y-axis, and Z-axis values are determined, a direction angle may be determined.

In operation 905, the terminal determines whether an inclination value is equal to or larger than a threshold. The inclination value is a value changed from a reference inclination value.

If the inclination value is less than the threshold, the terminal maintains the calculated tag location in operation 907. If the inclination value is equal to or larger than the threshold, the terminal corrects the calculated tag location in operation 909. For example, if the threshold is an inclination of 45 degrees, the terminal may maintain or correct the location of the tag with respect to 45 degrees.

In an embodiment of the present disclosure, the operations of FIGS. 4 and 9 may be performed in combination.

Figure 10:
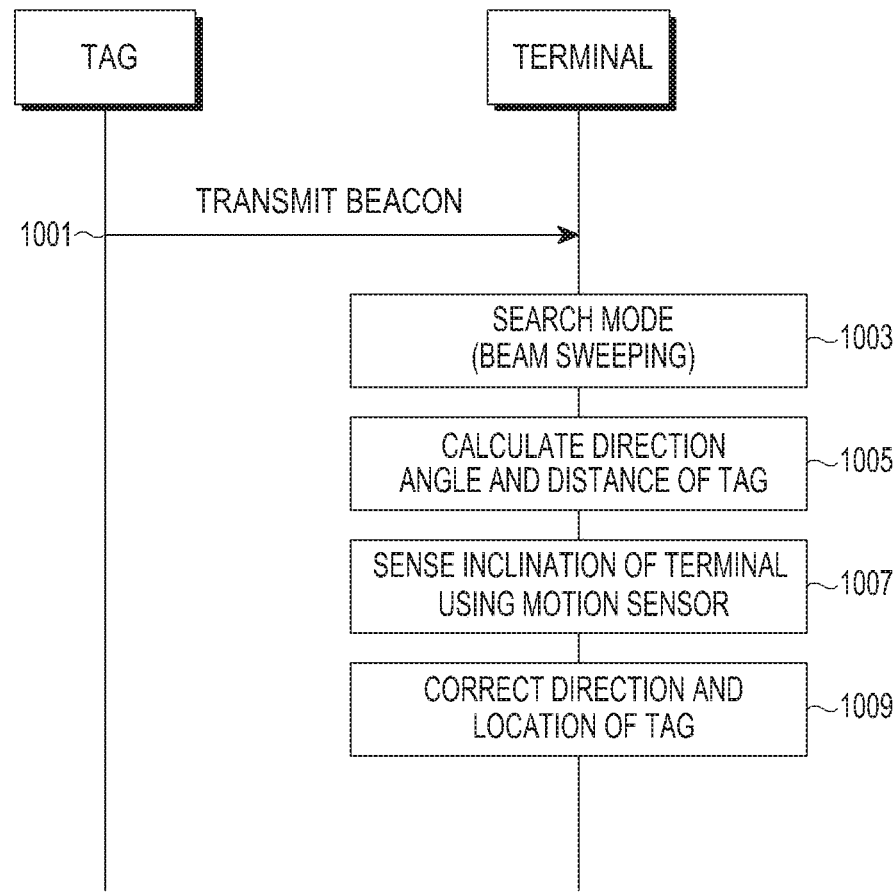
FIG. 10 is a flowchart illustrating a method for estimating a location in a terminal according to an embodiment of the present disclosure.

FIG. 10 is a flowchart illustrating a method for estimating a location in a terminal according to an embodiment of the present disclosure.

Referring to FIG. 10, the terminal receives a beacon signal from a tag in operation 1001.

In operation 1003, the terminal enters a search mode. Then the terminal detects the distances of adjacent devices. Upon user request or at a predetermined time, the terminal may automatically enter the search mode. For example, the terminal may enter the search mode by executing a specific application of a smartphone.

In operation 1005, the terminal calculates a direction angle and distance of a detected tag. The terminal may calculate phase information (DoA) based on a beacon signal received from the tag and calculate the direction angle and the distance between the tag and the terminal based on the calculated phase information.

Figure 11:
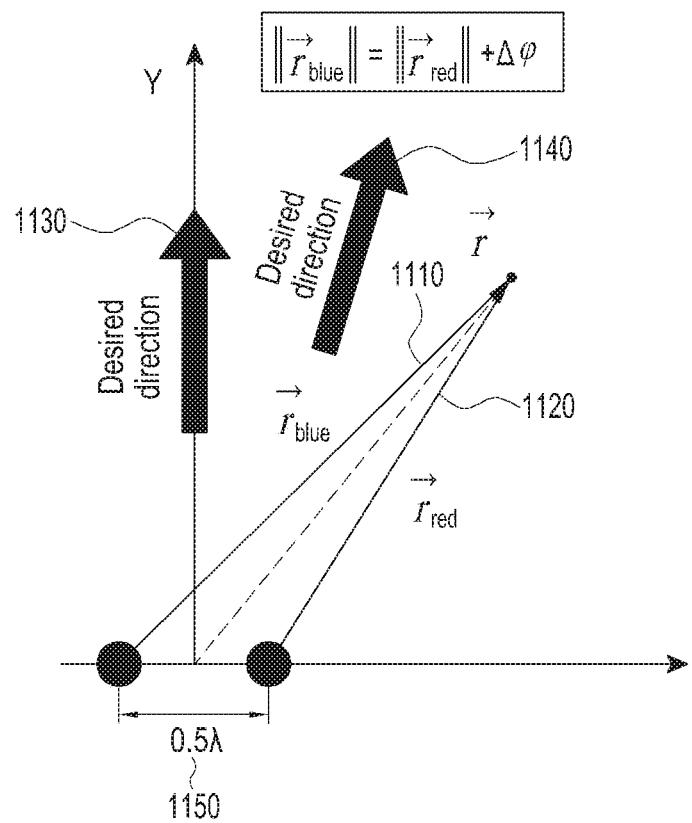
FIG. 11 is a view illustrating a method for calculating a direction of arrival (DoA) according to an embodiment of the present disclosure.

FIG. 11 is a view illustrating a method for calculating a DOA according to an embodiment of the present disclosure.

Referring to FIG. 11, there are two array antennas. Reference numeral 1130 denotes a direction component before a change, reference numeral 1140 denotes a direction component after the change, and reference numeral 1150 denotes a distance from a reference device to a moved device. Reference numeral 1110 denotes a direction vector after the change, and reference numeral 1120 denotes a direction vector before the change. The angle between the direction vectors 1110 and 1120 is $\varphi$.

A beam steering value is given as equation 29 according to $\varphi$.

$$\vec{E}(\vec{r},t) = \cos\left[2\pi f\left(t + \frac{\|\vec{r}_{blue}\|}{c}\right)\right] + \cos\left[2\pi f\left(t + \frac{\|\vec{r}_{red}\|}{c} + \Delta\varphi\right)\right] \quad \text{Equation 29}$$

$$= 2\cos\left[2\pi f\left(t + \frac{\|\vec{r}_{blue}\| + \|\vec{r}_{red}\|}{2c} + \frac{\Delta\varphi}{2}\right)\right]\cos\left[2\pi f\left(\frac{\|\vec{r}_{blue}\| + \|\vec{r}_{red}\|}{2c} - \frac{\Delta\varphi}{2}\right)\right]$$

The beam steering is represented in the portion of equation 29 provided below as equation 29(a).

$$\cos\left[2\pi f\left(\frac{\|\vec{r}_{blue}\| - \|\vec{r}_{red}\|}{2c} - \frac{\Delta\varphi}{2}\right)\right] \quad \text{Equation 29(a)}$$

Furthermore, $\varphi$ represents phase information about a received signal, $\vec{E}(\vec{r},t)$ represents the beam steering value, and c represents a constant value.

Figure 12A:
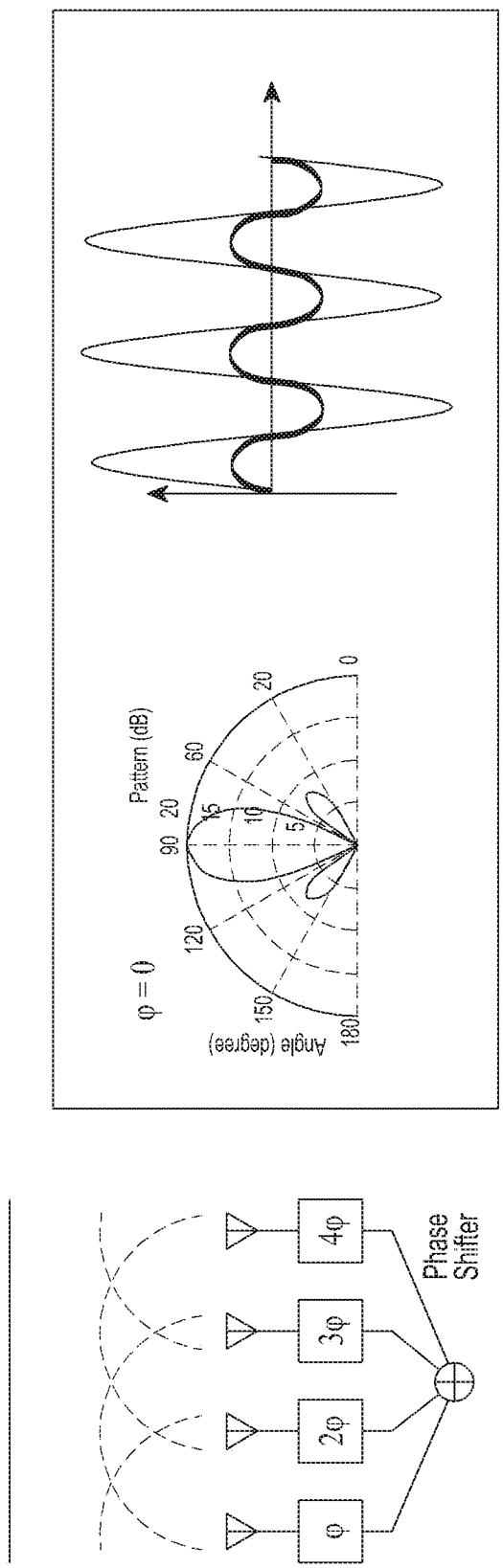
FIGS. 12A to 12C are views illustrating examples in which a direction angle or a beam width is changed according to an embodiment of the present disclosure.
Figure 12B:
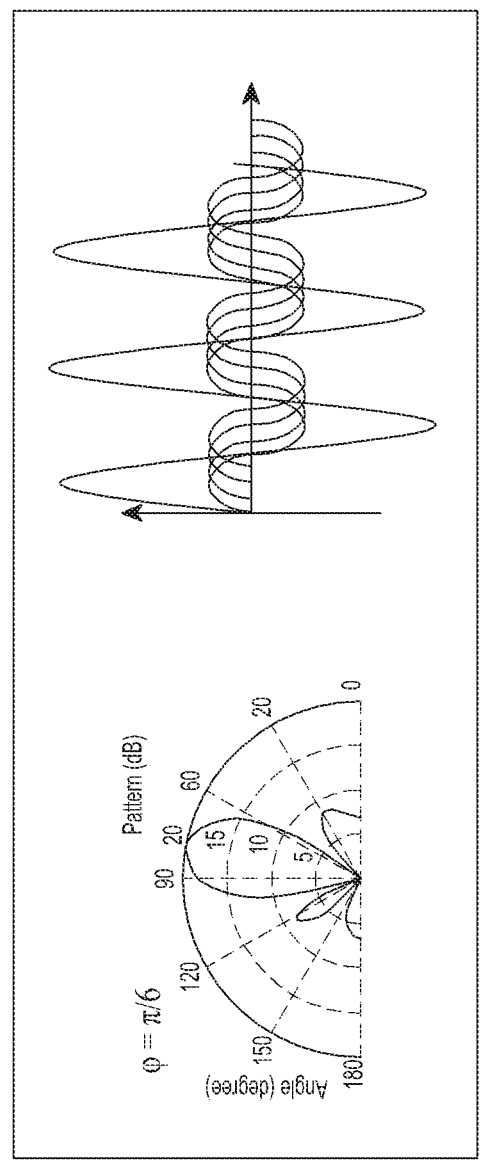
Figure 12B:
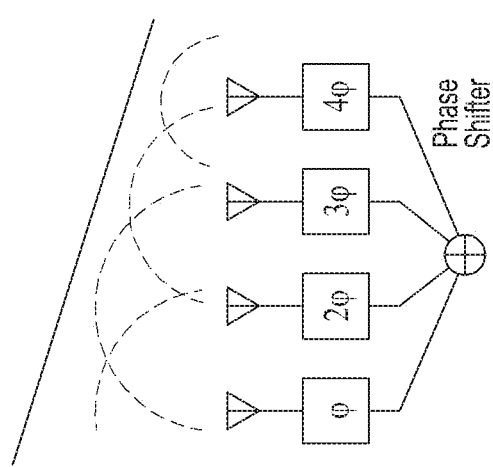
Figure 12C:
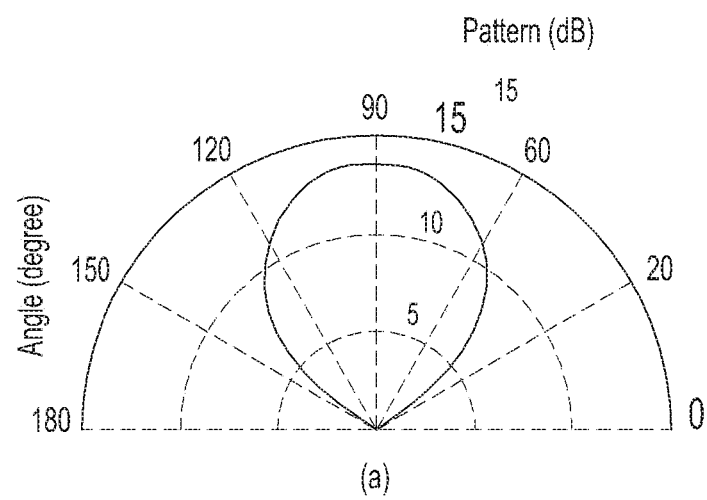
Figure 12C:
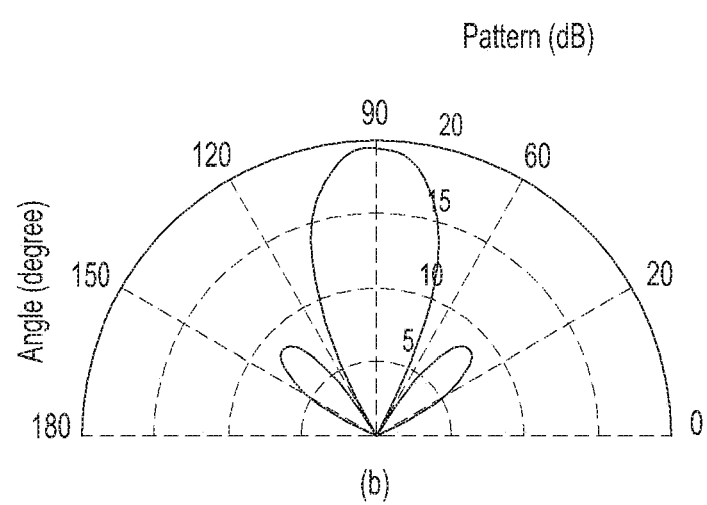

FIGS. 12A to 12C are views illustrating examples in which a direction angle or a beam width is changed according to an embodiment of the present disclosure.

Referring to FIGS. 12A and 12B, the beams directions illustrated in FIGS. 12A and 12B result according to $\varphi$. It is noted from FIGS. 12A and 12B that the beam directions are different according to $\varphi$.

According to an RMS value, a beam steering value is calculated by equation 30.

$$\vec{E}(\vec{r},t) = \cos\left[2\pi f\left(t + \frac{\|\vec{r}_{blue}\|}{c}\right)\right] + \cos\left[2\pi f\left(t + \frac{\|\vec{r}_{red}\|}{c}\right)\right] \quad \text{Equation 30}$$

-continued $$= 2\cos\left[2\pi f\left(t + \frac{\|\vec{r}_{blue}\| + \|\vec{r}_{red}\|}{2c} + \frac{\Delta\varphi}{2}\right)\right].$$

$$\cos\left[2\pi f\left(\frac{\|\vec{r}_{blue}\| - \|\vec{r}_{red}\|}{2c}\right)\right]$$

The RMS value is represented in the portion of equation 30 provided below as equation 30(a)

$$\cos\left[2\pi f\left(\frac{\|\vec{r}_{blue}\| - \|\vec{r}_{red}\|}{2c}\right)\right] \quad \text{Equation 30(a)}$$

Furthermore, $\vec{E}(\vec{r},t)$ represents the beam steering value. A beam width is changed according to an RMS value, as illustrated in (a) and (b) of FIG. 12C.

The direction angle and beam width of an AP determining the location of a terminal are changed according to phase information about a received signal and an RMS value.

The terminal calculates an inclination variation of the terminal by sensing the inclination of the terminal using a motion sensor value in operation 1007.

In operation 1009, the direction and location of the tag may be corrected using the inclination variation of the terminal.

The terminal may measure the distance between the terminal and the tag or the wireless transmission/reception device using an accelerometer sensor and a gyro sensor.

Figure 13A:
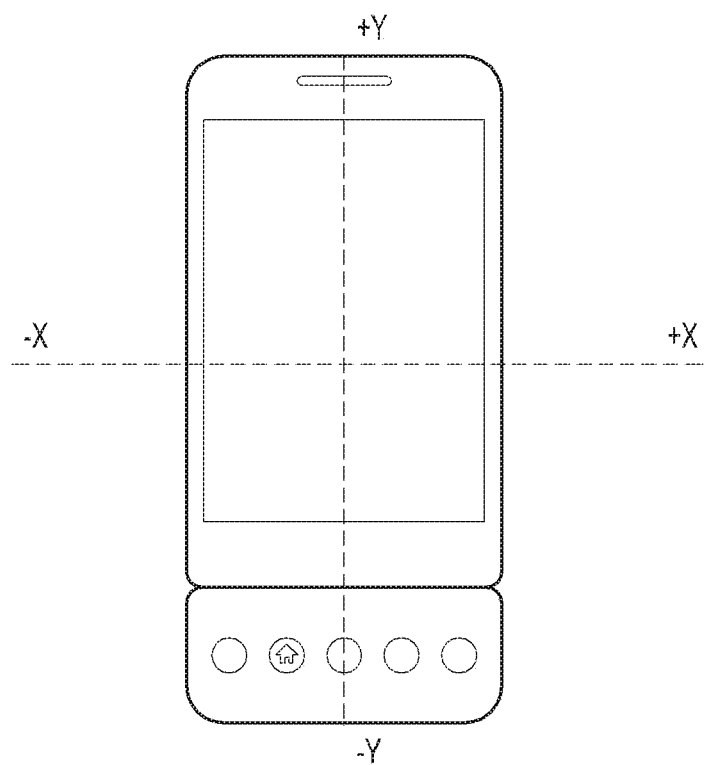
FIG. 13A is a view illustrating a state in which a terminal is placed evenly on a table, with a screen of the terminal facing upward according to an embodiment of the present disclosure.
Figure 13B:
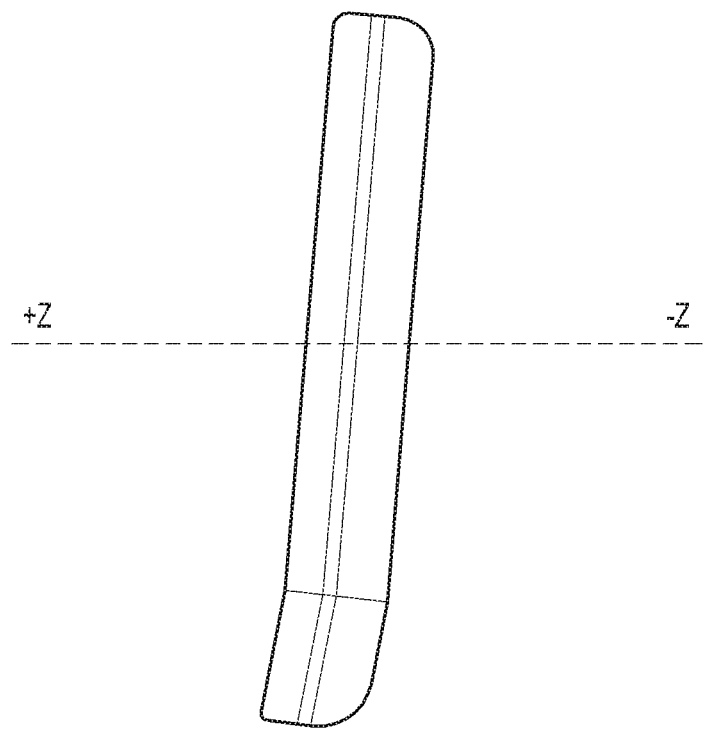
FIG. 13B is a view illustrating a state in which the screen of the terminal has been rotated around the Z axis according to an embodiment of the present disclosure.

FIG. 13A is a view illustrating a state in which a terminal is placed evenly on a table, with a screen of the terminal facing upward, and FIG. 13B is a view illustrating a state in which the screen of the terminal has been rotated around the Z axis according to an embodiment of the present disclosure.

Referring to FIGS. 13A and 13B, the gyro sensor is a sensor that measures the angular speed of a rotating object.

The X axis represents a horizontal axis on a screen (a short edge in the portrait mode and a long edge in the landscape mode), being directed to the right.

The Y axis represents a vertical axis on the screen, being directed toward the top of the screen. The Z axis is directed toward the sky, when the terminal is placed on a table with its screen facing upward.

The values of each array indicate an angle, and a rotation position around each axis is sensed with respect to a state in which the table is placed evenly on a table, with its screen facing upward.

values[0]: rotation around the Z axis (0≤azimuth<360)
0=North, 90=East, 180=South, 270=West
values[1]: rotation around the X axis (−180≤pitch≤180)
If the Z axis is directed toward the Y axis, a value larger than 0 is indicated.

If the terminal faces upward on the table, the value is 0; if the terminal faces downward from the table, the value is −180 or 180; if the terminal is upright, the value is −90; and if the terminal is upside down, the value is +90.

values[2]: rotation around the Y axis (−90≤roll≤90)
If the Z axis is directed toward the X axis, a value larger than 0 is indicated.

The accelerometer sensor measures an acceleration of the sensor.

The values of each array are represented in units of m/s2 and a contact force is measured.

values[0]: force applied to the X axis
values[1]: force applied to the Y axis
values[2]: force applied to the Z axis For example, if the left side surface of the terminal is pressed to the right, the X-axis acceleration value is a negative number. When the terminal is placed evenly on a table, it has a STANDARD_GRAVITY value, that is, −9.8 (m/s2). It indicates a force applied to the terminal in reaction to the gravity.

Figure 14:
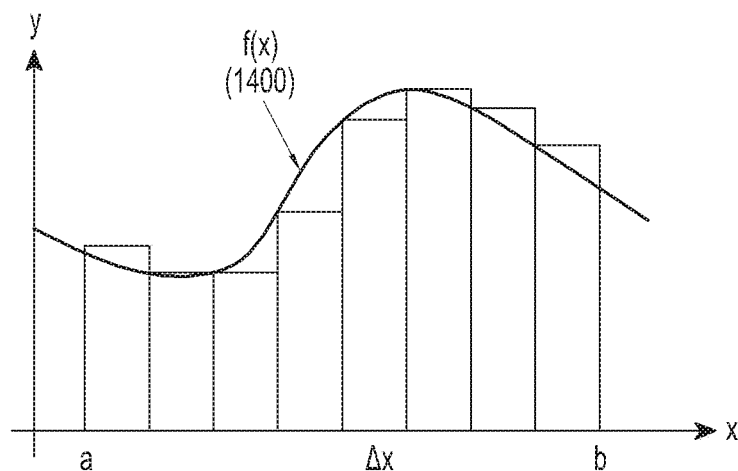
FIG. 14 is a graph to which an acceleration-based distance estimation algorithm is applied according to an embodiment of the present disclosure.

FIG. 14 is a graph to which an acceleration-based distance estimation algorithm is applied according to an embodiment of the present disclosure.

Referring to FIG. 14, the acceleration-based distance estimation algorithm is given as follows and may estimate the relationship between accelerations and distances.

A speed is calculated by integrating accelerations over time and a distance is calculated by integrating distances.

Therefore, a distance may be calculated by double integration of accelerations, expressed as equation 31 and equation 32.

$$v = \int (\vec{a})dt \text{ and } \vec{s} = \int (\vec{v})dt \therefore \int \left( \int (\vec{a})dt \right) dt \quad \text{Equation 31}$$

$$\int_a^b f(x)dx = \lim_{n \to \infty} \sum_{i=1}^n f(x_i) \Delta x \quad \text{Equation 32}$$

$$\Delta x = \frac{b-a}{n}$$

f(x) 1400 represents the sum of the areas of n squares which are divided by integration of a to b.

Figure 15:
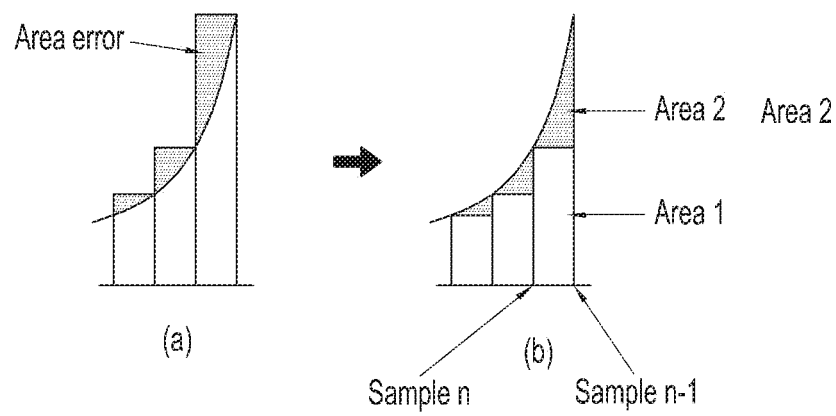
FIG. 15 is a view illustrating a trapezoidal method according to an embodiment of the present disclosure.

FIG. 15 is a view illustrating a trapezoidal method according to an embodiment of the present disclosure.

Referring to FIG. 15, an infinite number of samples leads to a perfect value during integration. However, area errors occur during quantization in view of limitations of sampling in real implementation. Therefore, the trapezoidal method with fewer errors is used.

If heights are assumed to be sample 1 and sample 2, equation 33 may be given.

$$\text{Area} = \text{Area1} + \text{Area2} \quad \text{Equation 33}$$
$$= \text{Area1} + \frac{(\text{Sample2} - \text{Sample1})}{2} \times T$$
$$\text{Area}_n = \text{Sample}_n + \frac{|\text{Sample}_n - \text{Sample}_{n-1}|}{2} \times T$$

Figure 16A:
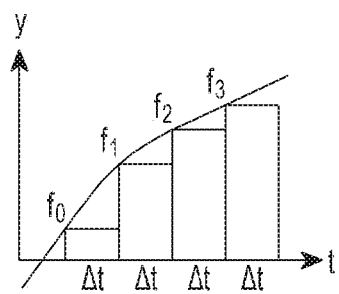
FIGS. 16A to 16C are views illustrating major numerical integration methods according to an embodiment of the present disclosure.
Figure 16B:
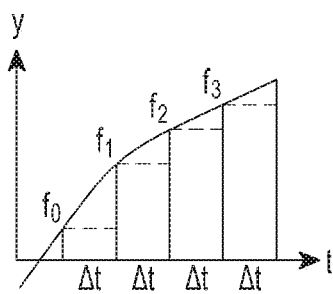
Figure 16C:
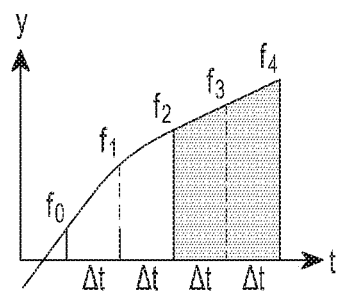

FIGS. 16A to 16C are views illustrating major numerical integration methods according to an embodiment of the present disclosure.

Referring to FIGS. 16A, 16B, and 16C, FIG. 16A illustrates measuring by division, FIG. 16B illustrates a keystone law, and FIG. 16B illustrates a Simpson's rule.

The measuring by division is the simplest method but with big errors in FIG. 16A. Errors are reduced with the keystone law of FIG. 16B. The Simpson's rule is characterized by approximation to a parabola using three samples every $2^{\Delta t}$ in FIG. 16C.

A location is estimated in the following manner.

Acceleration data values are subjected to double integration in the afore-described trapezoidal method.

First integration
velocityx[1]=velocityx[0]+accelerationx[0]+((accelerationx[1]−accelerationx[0])/2)

Second integration
locationX[1]=locationX[0]+velocityx[0]+((velocityx[1]−velocityx[0])/2)

The accurate location of the tag may be displayed by correcting a variation in the direction angle caused by displacement.

Figure 17:
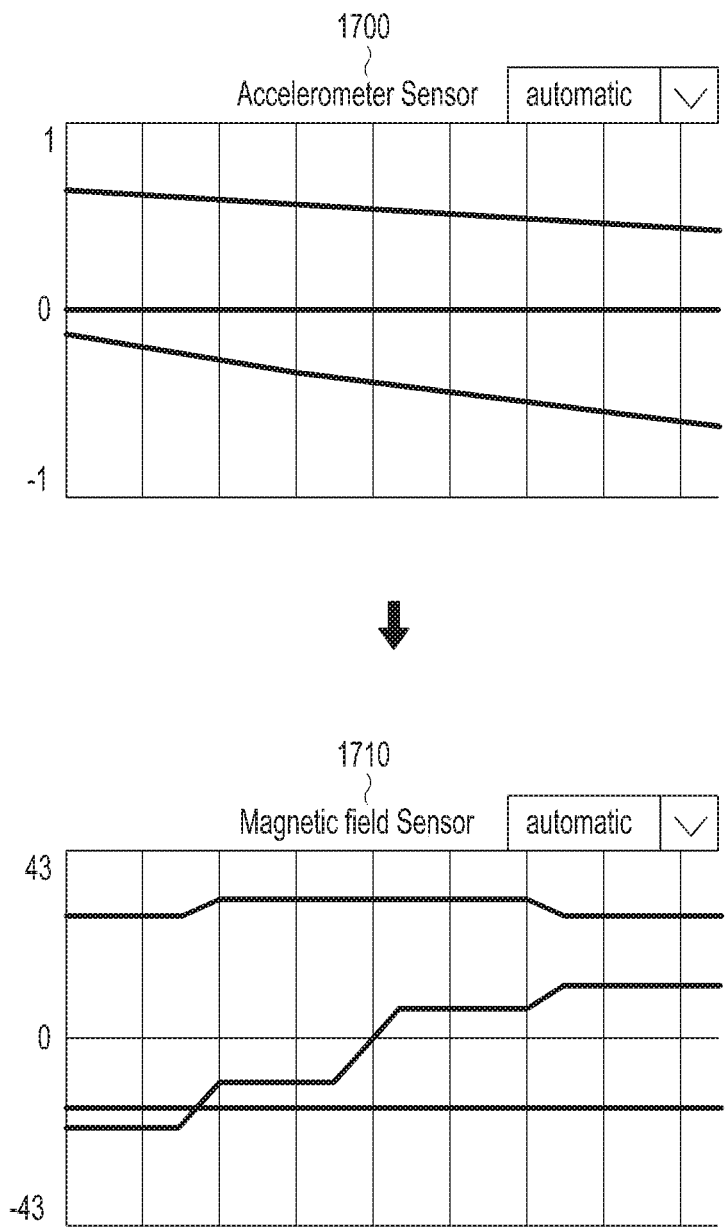
FIG. 17 is a graph illustrating variations in the value of an accelerometer sensor according to an embodiment of the present disclosure.

FIG. 17 is a graph illustrating variations in the value of an accelerometer sensor according to an embodiment of the present disclosure.

Referring to FIG. 17, if an accelerometer sensor 1700 has a maximum value of +1 and a minimum value of −1, the values of the accelerometer sensor 1700 is plotted on a graph with a maximum value of +1 and a minimum value of −1 along an axis. If the maximum value and the minimum value are +43 and −43, respectively, the maximum value and minimum value along the graph axis are automatically changed to +43 and −43, respectively in the graph of the values of a magnetic field sensor 1710.

Figure 18:
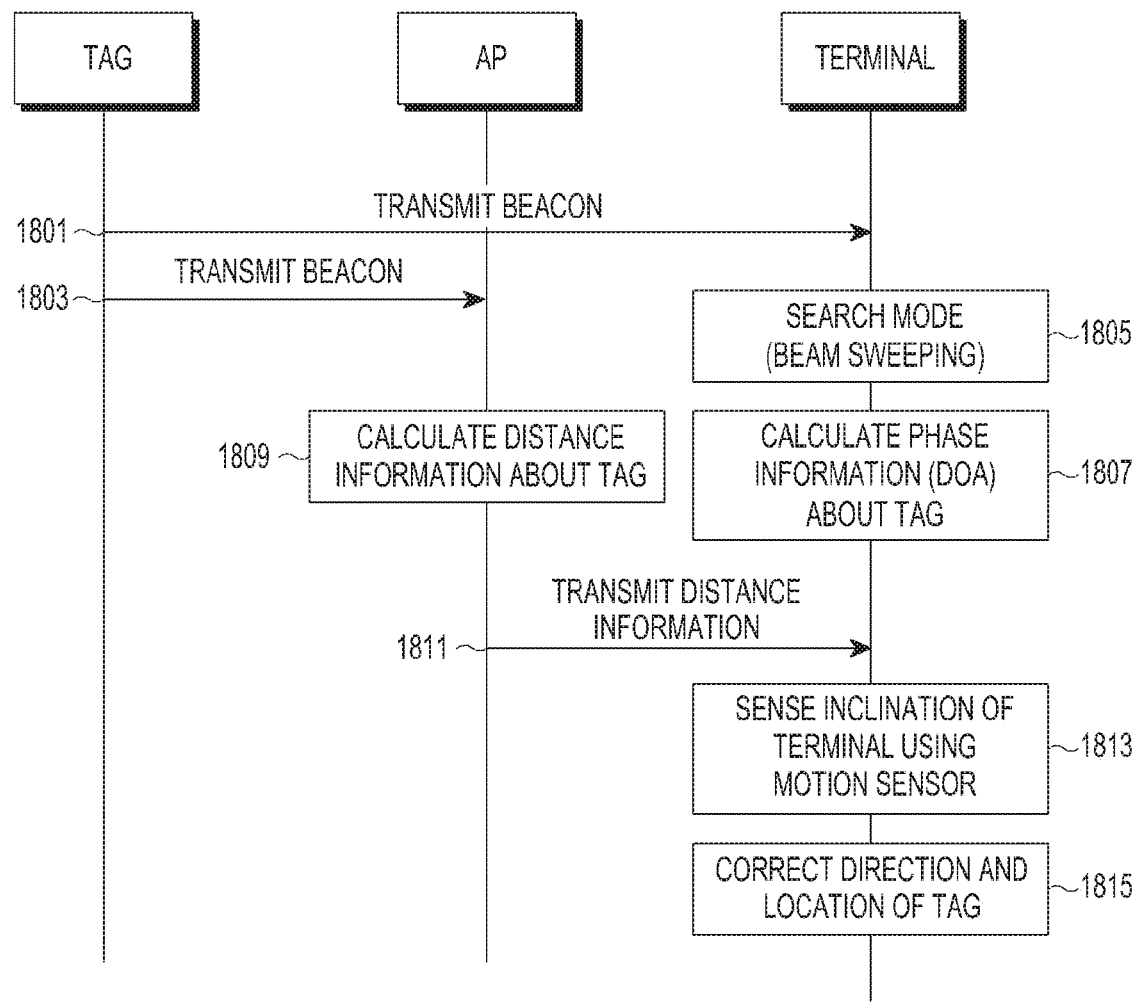
FIG. 18 is a diagram illustrating a signal flow for a method for estimating a location in a terminal according to an embodiment of the present disclosure.

FIG. 18 is a diagram illustrating a signal flow for a method for estimating a location in a terminal according to an embodiment of the present disclosure.

Referring to FIG. 18, in operation 1801, the terminal receives a beacon signal from a tag. An AP receives the beacon signal from the tag in operation 1803. Operation 1803 may precede operation 1801.

In operation 1805, the terminal enters a search mode. Then the terminal detects the distances of adjacent devices. Upon user request or at a predetermined time, the terminal may automatically enter the search mode. For example, the terminal may enter the search mode by executing a specific application of a smartphone.

In operation 1807, the terminal calculates phase information (DoA) based on the beacon signal received from the tag.

The AP receives the beacon signal from the tag in operation 1803. In operation 1809, the AP calculates the distance between the tag and the AP based on the received beacon signal. The AP may calculate phase information based on the beacon signal received from the tag, and calculate a direction angle and the distance between the tag and the AP based on the calculated phase information. The AP transmits information about the calculated distance between the tag and the AP to the terminal in operation 1811.

The terminal senses the inclination of the terminal using a motion sensor in operation 1813 and corrects the direction and location of the tag based on a variation in the inclination of the terminal in operation 1815.

In FIG. 18, operation 1807 may be performed before operation 1809 or operation 1809 may be performed before operation 1807.

Figure 19:
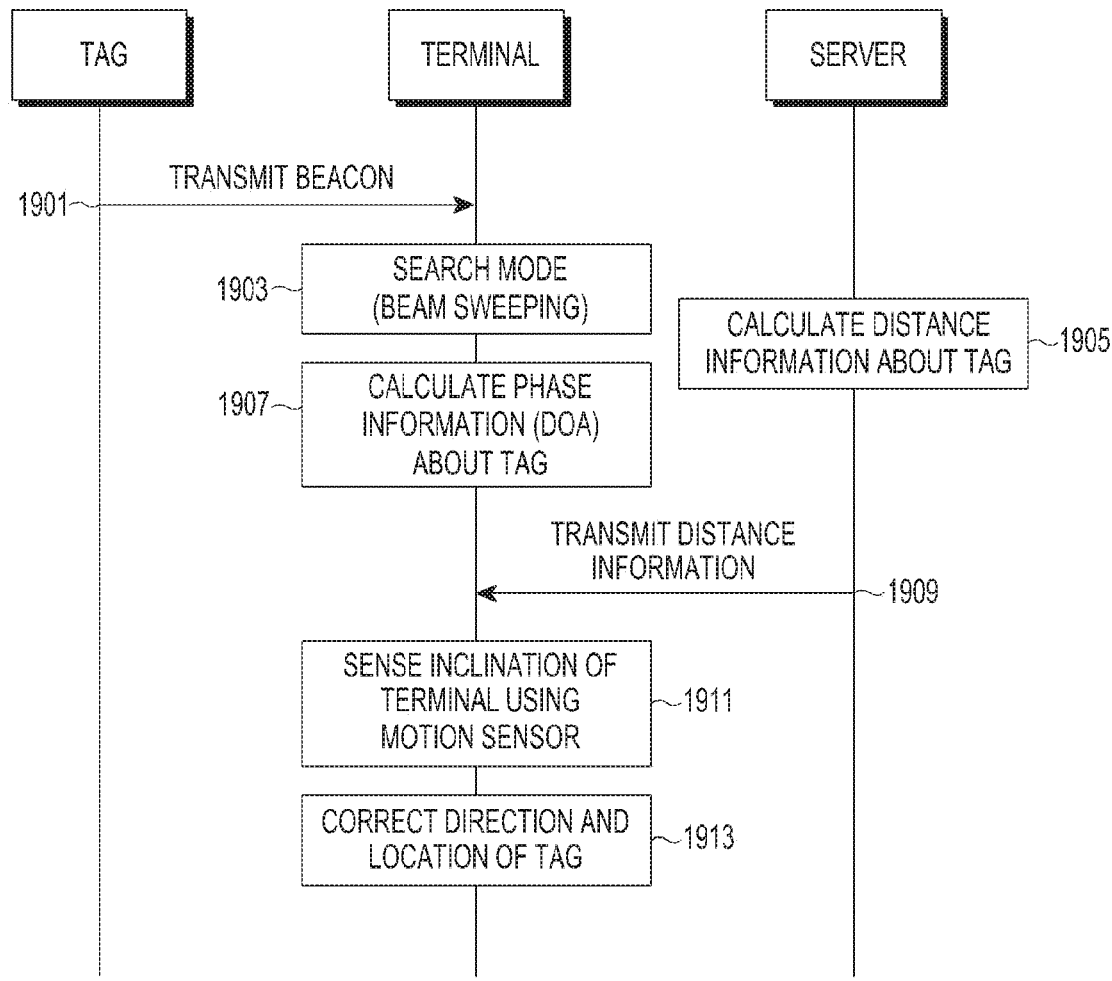
FIG. 19 is a diagram illustrating a signal flow for a method for estimating a location in a terminal according to an embodiment of the present disclosure.

FIG. 19 is a diagram illustrating a signal flow for a method for estimating a location in a terminal according to an embodiment of the present disclosure.

Referring to FIG. 19, in operation 1901, the terminal receives a beacon signal from a tag.

In operation 1903, the terminal enters a search mode. Then the terminal detects the distances of adjacent devices. Upon user request or at a predetermined time, the terminal may automatically enter the search mode. For example, the terminal may enter the search mode by executing a specific application of a smartphone.

In operation 1907, the terminal calculates phase information (DoA) based on the beacon signal received from the tag.

Meanwhile, a server calculates the distance between the tag and an AP in operation 1905 and transmits information about the calculated distance to the terminal in operation 1909. With the DOA of the tag, the direction angle of the tag may be represented as a 2D or 3D direction angle (horizontal and vertical angles).

The terminal senses the inclination of the terminal using a motion sensor in operation 1911 and corrects the direction and location of the tag based on a variation in the inclination of the terminal in operation 1913.

In FIG. 19, operation 1905 may be performed before operation 1907 or operation 1907 may be performed before operation 1905.

Figure 20:
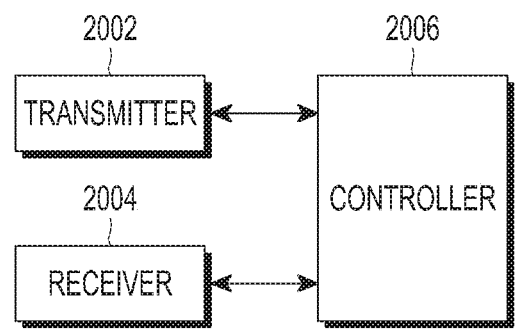
FIG. 20 is a block diagram of an application processor (AP) according to an embodiment of the present disclosure.

FIG. 20 is a block diagram of an AP according to an embodiment of the present disclosure.

Referring to FIG. 20, the AP includes a transmitter 2002, a receiver 2004, a controller 2006, and a memory (not shown).

According to an embodiment of the present disclosure, the transmitter 2002 and the receiver 2004 include a transmission module and a reception module, respectively for transmitting and receiving data to and from a terminal or a server.

The controller 2006 transmits a beacon signal to a terminal. The controller 2006 may calculate phase information (DoA) based on a beacon signal received from a tag and calculate a direction angle and the distance between the tag and the terminal based on the calculated phase information.

While not shown in FIG. 20, the memory may store a program for processing and controlling in the controller 2006 and temporarily store input/output data.

Figure 21:
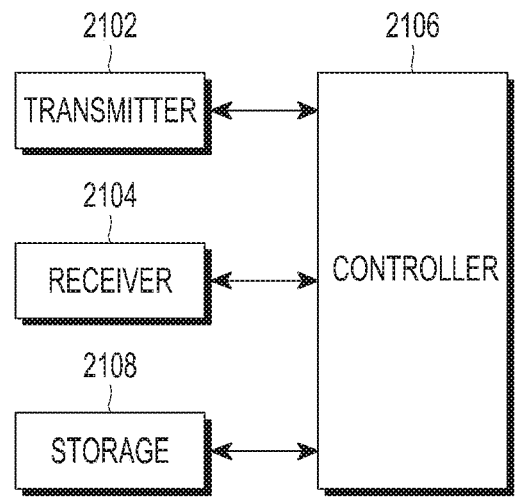
FIG. 21 is a block diagram of a tag according to an embodiment of the present disclosure.

FIG. 21 is a block diagram of a tag according to an embodiment of the present disclosure.

Referring to FIG. 21, the tag includes a transmitter 2102, a receiver 2104, a controller 2106, and a storage 2108.

The transmitter 2102 and the receiver 2104 include a transmission module and a reception module, respectively, for transmitting and receiving data to and from an AP or a terminal.

The controller 2106 controls a memory to store information about an object or a person.

The storage 2108 may store a program for processing and controlling in the controller 2106 and temporarily store input/output data (e.g., information about an object or a person).

Figure 22:
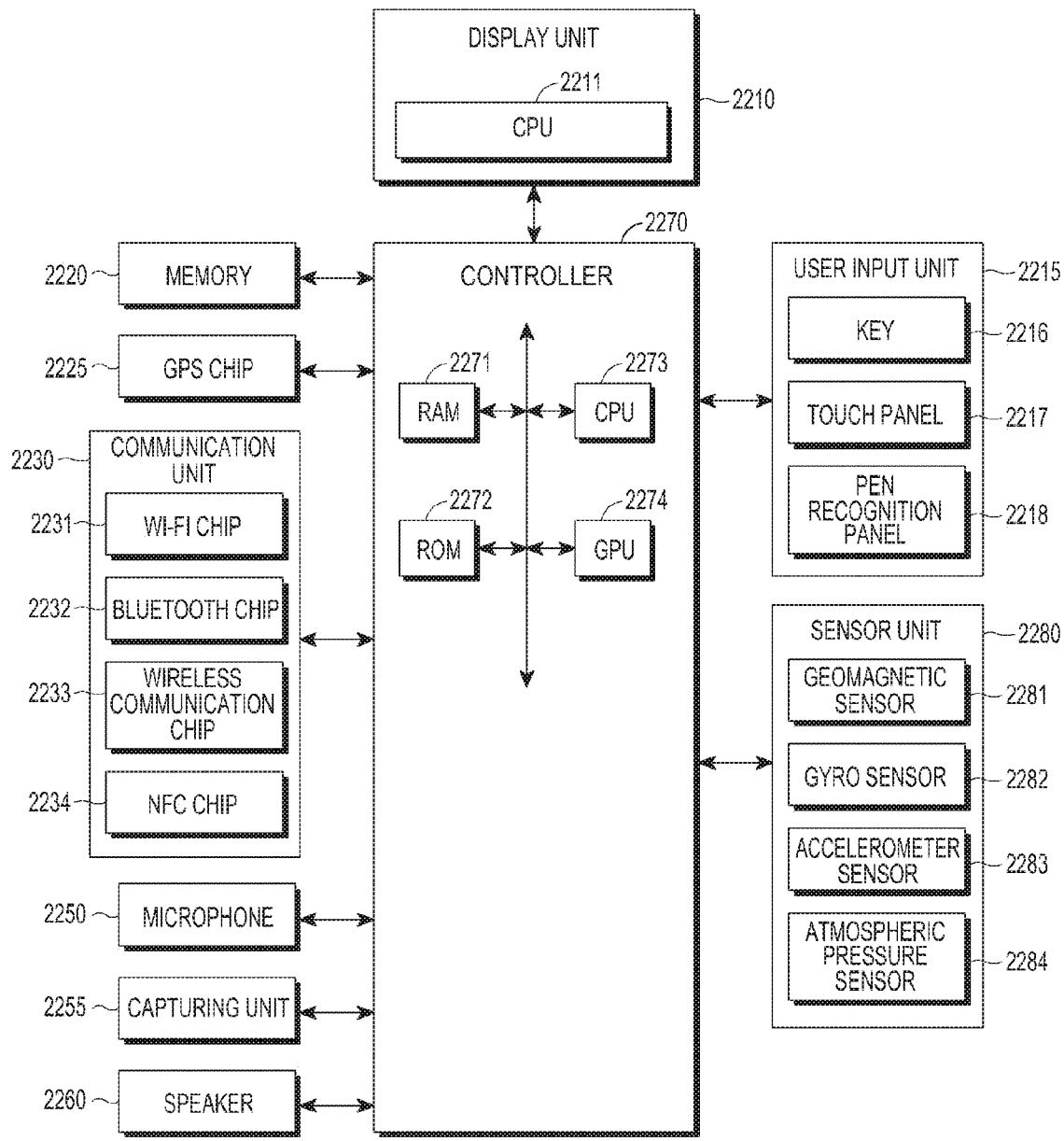
FIG. 22 is a block diagram of a terminal according to an embodiment of the present disclosure.

FIG. 22 is a block diagram of a terminal according to an embodiment of the present disclosure.

The terminal may be configured to include one or more of the components illustrated in FIG. 22.

Referring to FIG. 22, the terminal includes, a display unit 2210, a user input unit 2215, a memory 2220, a communication unit 2230, a GPS chip 2225, a microphone 2250, a capturing unit 2255, a speaker 2260, a controller 2270, and a sensor unit 2280.

The controller 2270 includes a central processing unit (CPU) 2273, a read only memory (ROM) 2272 that stores a control program for controlling the terminal, and a random access memory (RAM) 2271 used as a memory space for a task executed by the terminal, and controls other components of the terminal.

The communication unit 2230 is configured to transmit and receive information to and from an external device by wired/wires communication, and includes at least one of a Wi-Fi chip 2231, a BT chip 2232, a wireless communication chip 2233, and an NFC chip 2234.

The memory 2220 stores a program for performing an operation of the terminal and data generated during an operation.

The user input unit 2215 interfaces between a device and a user and may include a key 2216, a touch panel 2217, and a pen recognition panel 2218. When the key 2216, the touch panel 2217, or the pen recognition panel 2218 is pressed, a control command is generated and provided to the controller 2270. The controller 2270 controls an operation of the terminal according to the control command.

The GPS chip 2225 may receive signals from a plurality of GPS satellites (not shown) in orbit and calculate the location of the terminal using a ToA from the GPS satellites to the terminal and GPS parameters.

The terminal further includes the microphone 2250, the camera unit 2255, and the speaker 2260.

The microphone 2250 generates an electrical signal for the input of a voice or a sound under the control of the controller 2270.

The capturing unit 2255 captures an image according to a user manipulation.

The speaker 2260 may output a sound corresponding to various signals (e.g., a wireless signal, a broadcast signal, a digital audio file, a digital video file, or a photo shot) through the multi-display unit 2210.

The sensor unit 2280 is configured to sense at least one physical quantity existing within a predetermined range. For example, the sensor unit 2280 may include at least one of, for example, a camera for capturing an image, a geomagnetic sensor 2281 for determining a heading by detecting the flow of a magnetic field, a gyro sensor 2282 for detecting a motion by detecting a rotation speed, an infrared (IR) sensor (not shown) for detecting infrared light emitted from an object, an accelerometer sensor 2283 for detecting an acceleration according to a force applied to a moving object or a gravity acceleration of a stationary object, and an atmospheric pressure sensor 2284 for detecting an applied air pressure. An embodiment with the above sensors have been described before.

The display unit 2210 may be configured as a touch screen that displays information of various applications (e.g., call, data transmission, broadcasting, camera, etc.) executable by the controller 2270 and provides a user interface configured adaptively according to the information. The controller 2270 may control selection of a soft key displayed on the touch screen in response to a user gesture sensed on the touch screen or execution of an application or a function corresponding to the soft key. The user gesture includes a touch made by a finger or a tool, and recognition of a motion made by a human body.

Figure 23:
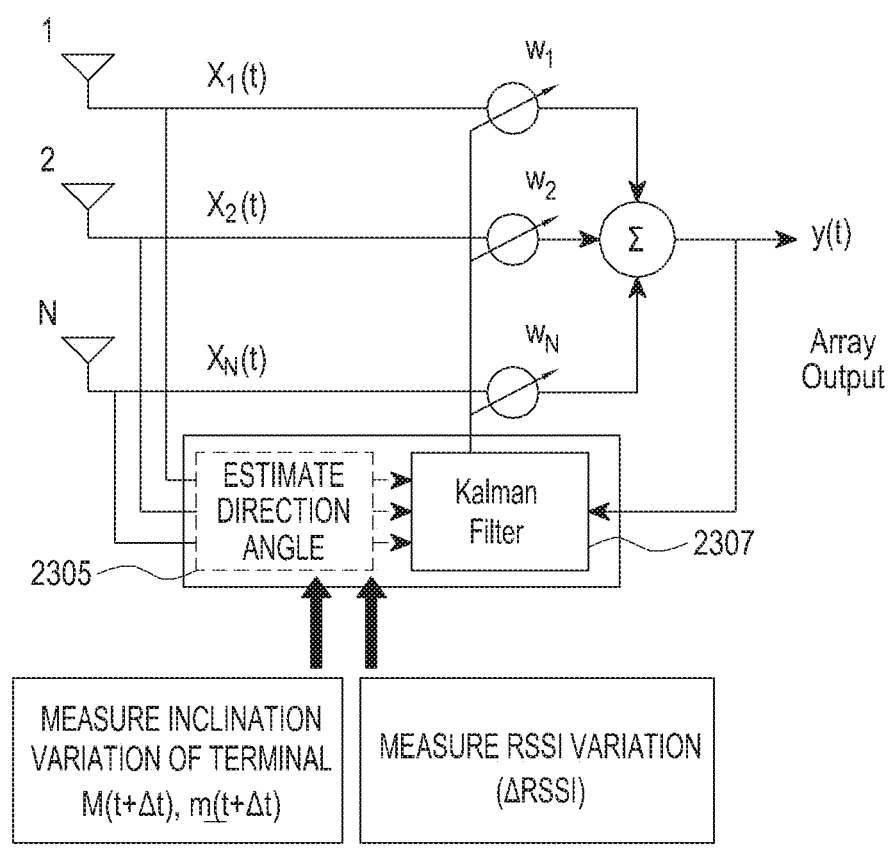
FIG. 23 is a detailed diagram illustrating structures of an antenna unit and a beamforming transceiver in a terminal according to an embodiment of the present disclosure.

FIG. 23 is a diagram illustrating an antenna unit and a beamforming transceiver in a terminal according to an embodiment of the present disclosure.

Referring to FIG. 23, the antenna unit includes N array antennas, and the beamforming transceiver includes a direction angle estimator 2305 and a Kalman filter 2307.

The direction angle estimator 2305 measures a variation in the inclination of the terminal according to an embodiment of the present disclosure. The inclination variation of the terminal is determined based on M(t+Δt), m(t+Δt). The direction angle estimator 2305 measures an RSSI and determines an RSSI variation according to an embodiment of the present disclosure.

The Kalman filter 2307 tracks and corrects the location of a tag using tag angle measurement information (information about the direction angle of the tag) according to an embodiment of the present disclosure.

As is apparent from the foregoing description of the present disclosure, a terminal can estimate the location or direction of an object with minimal installation cost.

The terminal can estimate the location or direction of an object in real time.

The terminal can accurately estimate the location or direction of an object.

The method and apparatus for estimating a location in a terminal according to an embodiment of the present disclosure may be implemented in hardware, software, or a combination of hardware and software. The software may be stored, for example, irrespective of erasable or rewritable, in a volatile or non-volatile storage device such as a storage device like ROM, a memory such as RAM, a memory chip, or an integrated circuit (IC), or an optically or magnetically writable and machine-readable (e.g., computer-readable) storage medium such as compact disc (CD), digital versatile disc (DVD), or magnetic tape. The method for estimating a location in a terminal according to the embodiment of the present disclosure may be implemented by a computer or a portable terminal including a controller and a memory. The memory is an example of a machine-readable storage medium suitable for storing a program or programs including instructions that implement various embodiments of the present disclosure.

Accordingly, the present disclosure includes a program including code for implementing the apparatus or method as disclosed in the claims and a machine-readable storage medium that stores the program. Also, this program may be electronically transferred through a medium such as a communication signal transmitted by wired or wireless connection and the present disclosure includes its equivalents appropriately.

The apparatus for estimating a location in a terminal according to the embodiment of the present disclosure may receive a program from a wired or wirelessly connected program providing device and store the program. The program providing device may include a program having instructions for implementing the method for estimating a location in a terminal, a memory for storing information needed for the location estimation method, a communication unit for conducting wired or wireless communication of the electronic device, and a controller for transmitting the program upon request of the program providing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for estimating a location in a terminal, the method comprising:
    calculating a location of a tag;
    calculating information about movement of the terminal using a motion sensor of the terminal; and
    correcting the calculated location of the tag based on the information about the movement of the terminal,
    wherein the information about the movement of the terminal includes an inclination variation of the motion sensor, and
    wherein the correcting of the calculated location of the tag comprises:
        correcting the calculated location of the tag, if the inclination variation of the motion sensor is greater than or equal to a threshold, and
        maintaining the calculated location of the tag, if the inclination variation of the motion sensor is less than the threshold.

2. The method of claim 1, wherein the calculating of the location of the tag comprises calculating the location of the tag based on a first direction angle of a signal received from the tag.

3. The method of claim 2, wherein the information about the movement of the terminal is calculated based on a received signal strength indicator of the signal received from the tag.

4. The method of claim 3, wherein the correcting of the calculated location of the tag comprises:
    measuring a second direction angle based on the information about the movement of the terminal;
    determining a direction angle of the tag by combining the second direction angle with the information about the movement of the terminal, if a received signal strength indicator of a signal received if the second direction angle is measured is greater than a received signal strength indicator of a signal received if the first direction angle is measured; and
    determining the first direction angle to be the direction angle of the tag, if the received signal strength indicator or a variation in the received signal strength indicator is less than a current value.

5. The method of claim 3, wherein the correcting of the calculated location of the tag comprises:
    measuring a second direction angle based on the information about the movement of the terminal;
    determining a direction angle of the tag by combining the second direction angle with the information about the movement of the terminal, if a beam width or a beam width variation of a signal received if the second direction angle is measured is less than a beam width or a beam width variation of a signal received if the first direction angle is measured; and
    determining the first direction angle to be the direction angle of the tag, if the beam width of the received signal is less than a current beam width or beam width variation.

6. The method of claim 1, wherein the information about the movement of the terminal further includes a movement distance of the terminal.

7. The method of claim 1, further comprising:
    determining an inclination variation of the motion sensor; and
    correcting the calculated location of the tag based on the inclination variation of the motion sensor.

8. The method of claim 1, further comprising:
    determining an inclination variation of the motion sensor.

9. The method of claim 1, wherein the location of the tag is calculated based on a direction of arrival (DoA) of a received signal.

10. The method of claim 1, wherein the inclination variation of the motion sensor is sensed using at least one of a gravity sensor, a gyro senor, or an accelerometer sensor.

11. The method of claim 1,
    wherein a movement distance of the tag is measured using at least one of a gyro senor or an accelerometer sensor, and
    wherein a direction angle of the tag is measured according to a trigonometric method.

12. An apparatus for estimating a location in a terminal, the apparatus comprising:
    a controller configured to:
        calculate a location of a tag, calculating information about movement of the terminal using a motion sensor of the terminal, and
        correct the calculated location of the tag based on information about the movement of the terminal,
    wherein the information about the movement of the terminal includes an inclination variation of the motion sensor, and wherein the controller is further configured to:
  correct the calculated location of the tag by correcting the calculated location of the tag, if the inclination variation of the motion sensor is greater than or equal to a threshold, and
  maintain the calculated location of the tag, if the inclination variation of the motion sensor is less than the threshold.

13. The apparatus of claim 12, wherein the controller is further configured to, if the controller calculates the location of the tag, calculate the location of the tag based on a first direction angle of a signal received from the tag.

14. The apparatus of claim 13, wherein the information about the movement of the terminal is calculated based on a received signal strength indicator of the signal received from the tag.

15. The apparatus of claim 14, wherein the controller is further configured to, if the controller corrects the calculated location of the tag:
  measure a second direction angle based on the information about the movement of the terminal,
  determine a direction angle of the tag by combining the second direction angle with the information about the movement of the terminal, if a received signal strength indicator of a signal received if the second direction angle is measured is greater than a received signal strength indicator of a signal received if the first direction angle is measured, and
  determine the first direction angle to be the direction angle of the tag, if the received signal strength indicator or a variation in the received signal strength indicator is less than a current value.

16. The apparatus of claim 14, wherein the controller is further configured to, if the controller corrects the calculated location of the tag:
  measure a second direction angle based on the information about the movement of the terminal,
  determine a direction angle of the tag by combining the second direction angle with the information about the movement of the terminal, if a beam width or a beam width variation of a signal received if the second direction angle is measured is less than a beam width or a beam width variation of a signal received if the first direction angle is measured, and
  determine the first direction angle to be the direction angle of the tag, if the beam width of the received signal is less than a current beam width or beam width variation.

17. The apparatus of claim 12, wherein the information about the movement of the terminal further includes a movement distance of the terminal.

18. The apparatus of claim 12, wherein the controller is further configured to:
  determine an inclination variation of the motion sensor.

19. The apparatus of claim 12, further comprising:
the motion sensor,
wherein the motion sensor is at least one of a gravity sensor, a gyro senor, or an accelerometer sensor.

20. A method for estimating a location in an access point, the method comprising:
  receiving a beacon signal from a tag;
  determining location information of the tag;
  transmitting the determined location information of the tag to a terminal; and
  receiving, from the terminal, information about a location of the tag corrected based on information about movement of the terminal and the determined location information of the tag,
  wherein the information about the movement of the terminal includes an inclination variation of a motion sensor of the terminal,
  wherein the receiving, from the terminal, the corrected information about the location of the tag comprises:
    identifying that the determined location information of the tag is corrected, if the inclination variation of the motion sensor is greater than or equal to a threshold, and
    identifying that the determined location information of the tag is maintained, if the inclination variation of the motion sensor is less than the threshold.

21. An apparatus for estimating a location in an access point, the apparatus comprising:
  a receiver configured to receive a beacon signal from a tag;
  a transmitter configured to:
    determine location information of the tag, and
    transmit the determined location information of the tag to a terminal; and
  a controller configured to receive, from the terminal, information about a location of the tag corrected based on information about movement of the terminal and the determined location information of the tag,
  wherein the information about the movement of the terminal includes an inclination variation of a motion sensor of the terminal, and
  wherein the controller is further configured to:
    identify that the determined location information of the tag is corrected, if the inclination variation of the motion sensor is greater than or equal to a threshold, and
    identify that the determined location information of the tag is maintained, if the inclination variation of the motion sensor is less than the threshold.

* * * * *